(12) United States Patent
Nagasaka

(10) Patent No.: US 12,124,634 B2
(45) Date of Patent: Oct. 22, 2024

(54) INFORMATION PROCESSING APPARATUS, INFORMATION PROCESSING SYSTEM, AND INFORMATION PROCESSING METHOD

(71) Applicant: SONY GROUP CORPORATION, Tokyo (JP)

(72) Inventor: Hideo Nagasaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/040,187

(22) PCT Filed: Aug. 11, 2021

(86) PCT No.: PCT/JP2021/029639
§ 371 (c)(1),
(2) Date: Feb. 1, 2023

(87) PCT Pub. No.: WO2022/039087
PCT Pub. Date: Feb. 24, 2022

(65) Prior Publication Data
US 2023/0305631 A1 Sep. 28, 2023

(30) Foreign Application Priority Data
Aug. 21, 2020 (JP) ................................. 2020-139940

(51) Int. Cl.
*G06F 17/00* (2019.01)
*G06F 3/01* (2006.01)
(Continued)

(52) U.S. Cl.
CPC .............. *G06F 3/017* (2013.01); *G06F 3/165* (2013.01); *H04N 21/47217* (2013.01)

(58) Field of Classification Search
CPC .......... G06F 3/017; G06F 3/165; G06F 3/012; G06F 3/0482; G06F 3/0484; H04N 21/47217; H04N 21/4394; H04N 21/44218
See application file for complete search history.

(56) References Cited

U.S. PATENT DOCUMENTS 8,646,002 B2 * 2/2014 Lee .................... H04N 21/6547
725/54
9,818,448 B1 * 11/2017 Sexton ................. H04N 9/8211
(Continued)

FOREIGN PATENT DOCUMENTS

CN    105980963 A   *  9/2016   ............. G06F 3/017
JP    2002-044591 A    2/2002
(Continued)

OTHER PUBLICATIONS

International Search Report and Written Opinion of PCT Application No. PCT/JP2021/029639, issued on Oct. 12, 2021, 08 pages of ISRWO.

*Primary Examiner* — Laurie A Ries
(74) *Attorney, Agent, or Firm* — CHIP LAW GROUP

(57) ABSTRACT

An information processing apparatus includes a control unit. The control unit accepts a user operation during reproduction of content having a predetermined time length and variably controls processing to be executed for the user operation in accordance with a reproduction position of the content when the user operation is performed. The information processing apparatus executes processing suitable for an intention of a user in processing related to the content.

18 Claims, 18 Drawing Sheets

(51) Int. Cl.
*G06F 3/16* (2006.01)
*H04N 21/472* (2011.01)

(56) References Cited

U.S. PATENT DOCUMENTS

| | | | |
|---|---|---|---|
| 2003/0043506 A1* | 3/2003 | Iizuka | G11B 15/04 |
| 2007/0097799 A1* | 5/2007 | Ohizumi | H04N 21/4325 |
| | | | 369/30.04 |
| 2010/0188936 A1* | 7/2010 | Beppu | H04N 21/4821 |
| | | | 368/29 |
| 2013/0151339 A1* | 6/2013 | Kim | G06Q 30/02 |
| | | | 705/14.55 |
| 2014/0181158 A1* | 6/2014 | Herz | G06F 16/48 |
| | | | 707/821 |
| 2014/0281988 A1* | 9/2014 | Watts | H04L 65/612 |
| | | | 715/716 |
| 2016/0124514 A1* | 5/2016 | Cha | G06F 3/04847 |
| | | | 715/767 |
| 2017/0339462 A1* | 11/2017 | Clarke | H04N 21/44008 |
| 2018/0091848 A1* | 3/2018 | Jain | H04N 21/4333 |
| 2023/0245456 A1* | 8/2023 | Nakade | G06V 20/50 |
| | | | 345/156 |
| 2023/0406533 A1* | 12/2023 | Chavez | G01C 23/005 |
| 2024/0005376 A1* | 1/2024 | Estes | G06Q 50/26 |

FOREIGN PATENT DOCUMENTS

| | | | | |
|---|---|---|---|---|
| JP | 2005-025913 A | 1/2005 | | |
| WO | WO-2010073343 A1 * | 7/2010 | | G06F 3/017 |
| WO | WO-2013063620 A1 * | 5/2013 | | H04N 21/47205 |
| WO | WO-2017059384 A1 * | 4/2017 | | G06F 16/70 |
| WO | 2019/123785 A1 | 6/2019 | | |

* cited by examiner

INFORMATION PROCESSING APPARATUS, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2021/029639 filed on Aug. 11, 2021, which claims priority benefit of Japanese Patent Application No. JP 2020-139940 filed in the Japan Patent Office on Aug. 21, 2020. Each of the above-referenced applications is hereby incorporated herein by reference in its entirety.

TECHNICAL FIELD

The present technology relates to a technology of an information processing apparatus and the like that executes processing related to reproducible content.

BACKGROUND ART

In the related art, there is known a technique for executing processing related to content such as music and a moving image based on a user operation.

On the other hand, in recent years, there is known a technique in which nodding, swing, or the like by a user is detected by, for example, a headphone worn on ears, and processing related to content is executed based on the nodding, the swing, or the like (for example, see Patent Literature 1).

CITATION LIST

Patent Literature

Patent Literature 1: PCT International Application Publication No. 2019-123785

DISCLOSURE OF INVENTION

Technical Problem

For example, in the related field, there is a need for a technique capable of executing processing suitable for an intention of a user.

In view of the above-described circumstances, an object of the present technology is to provide a technology of an information processing apparatus or the like capable of executing the processing suitable for the intention of the user in processing related to content.

Solution to Problem

An information processing apparatus according to the present technology comprises a control unit. The control unit accepts a user operation during reproduction of content having a predetermined time length and variably controls processing to be executed for the user operation in accordance with a reproduction position of the content when the user operation is performed.

This makes it possible to execute the processing suitable for the intention of the user in the processing related to the content.

An information processing system according to the present technology includes a first device and a second device.

The first device detects a user operation.

The second apparatus accepts the user operation during reproduction of content having a predetermined time length and variably controls processing to be executed for the user operation in accordance with a reproduction position of the content when the user operation is performed.

An information processing method according to the present technology accepts a user operation during reproduction of content having a predetermined time length and variably controls processing to be executed for the user operation in accordance with a reproduction position of the content when the user operation is performed.

A program according to the present technology causes a computer to execute processing of accepting a user operation during reproduction of content having a predetermined time length and variably controlling processing to be executed for the user operation in accordance with a reproduction position of the content when the user operation is performed.

MODE(S) FOR CARRYING OUT THE INVENTION

Hereinafter, embodiments according to the present technology will be described below with reference to the drawings.

First Embodiment

Overall Configuration and Configuration of Each Unit

Figure 1:
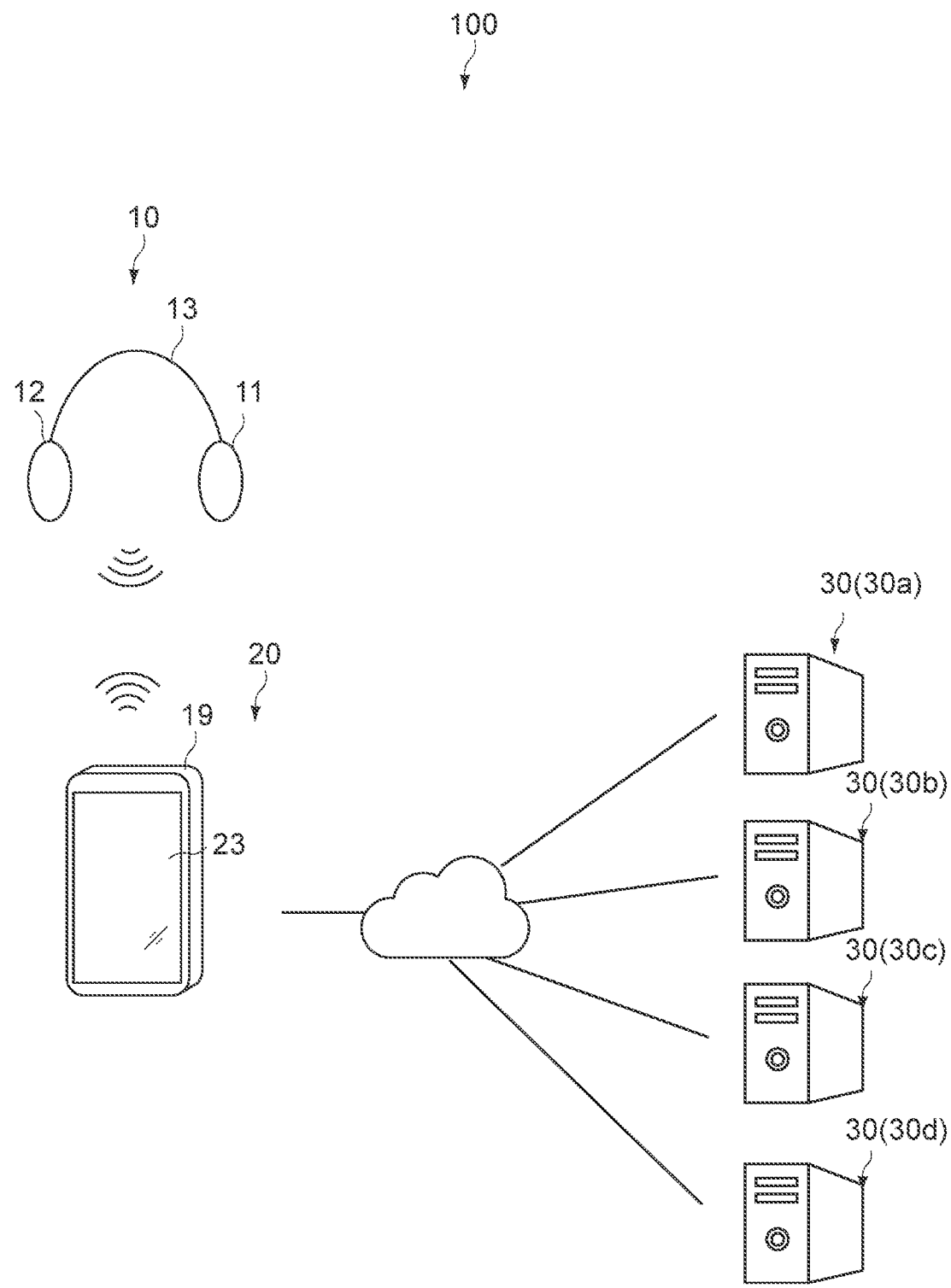
FIG. 1 is a diagram showing an information processing system according to a first embodiment of the present technology.

FIG. 1 is a diagram showing an information processing system 100 according to a first embodiment of the present technology. As shown in FIG. 1, the information processing system 100 includes a headphone 10, a smartphone 20, and a plurality of server devices 30.

Headphone 10

The headphone 10 (first device) includes a first headphone unit 11 worn on a right ear side, a second headphone unit 12 worn on a left ear side, and a band portion 13 connecting the first headphone unit 11 and the second headphone unit 12.

In the embodiment shown in FIG. 1, an example is shown in which the two headphone units 11 and 12 are connected by the band portion 13, but the two headphone units 11 and 12 may be separately configured.

Figure 2:
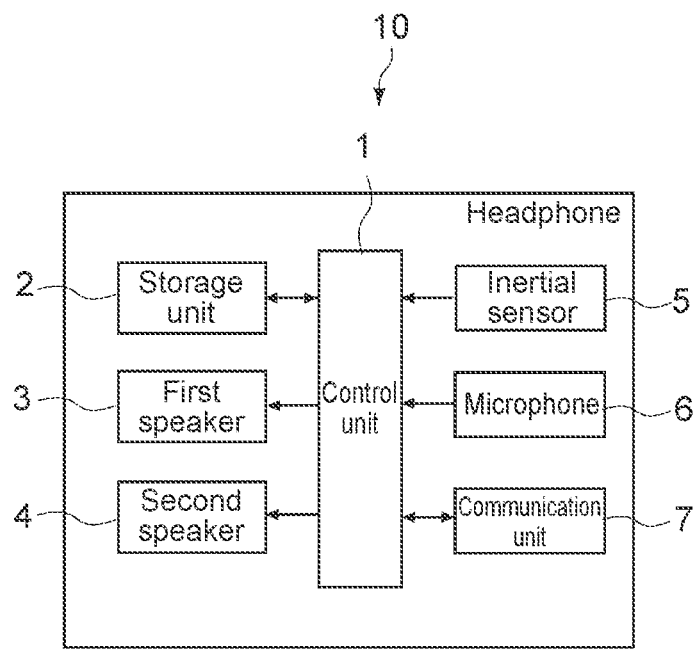
FIG. 2 is a block diagram showing an internal configuration of a headphone.

FIG. 2 is a block diagram showing an internal configuration of the headphone 10. As shown in FIG. 2, the headphone 10 includes a control unit 1, a storage unit 2, a first speaker 3, a second speaker 4, an inertial sensor 5, a microphone 6, and a communication unit 7.

The first speaker 3 is provided on a first headphone unit 11 side and the second speaker 4 is provided on a second headphone unit 12 side. The first speaker 3 and the second speaker 4 output sound based on a sound signal input from the control unit 1.

The inertial sensor 5 includes, for example, an acceleration sensor that detects acceleration in orthogonal three axes directions and an angular velocity sensor that detects angular velocity around orthogonal three axes. The inertial sensor 5 outputs the detected acceleration in the three axes directions and the detected angular velocity around the three axes to the control unit as inertial information.

In this example, the detection axis of the inertial sensor 5 is three axes, but the detection axis may be one axis or two axes. In addition, in this embodiment, although two types of sensors are used as the inertial sensor 5, but one type or three or more types of sensors may be used as the inertial sensor 5. Note that other examples of the inertial sensor 5 include a speed sensor and an angle sensor.

The inertial sensor 5 is a sensor for detecting various gesture operations by the user. The gesture operation may be, for example, swinging a head, swinging the head twice, nodding, the nodding twice, quickly turning to the right, or quickly turning to the left, but the gesture operation may be any operation.

The microphone 6 converts various sounds such as a voice of a user into an electric signal and outputs the electric signal to the control unit 1. The communication unit 7 is configured to be able to intercommunicate with the smartphone 20 wirelessly or wired.

The storage unit 2 includes a non-volatile memory that stores various kinds of programs and data necessary for the processing performed by the control unit 1 and a volatile memory used as a workspace for the control unit 1.

Note that the various programs may be read from a portable recording medium such as an optical disk and a semiconductor memory or may be downloaded from a server apparatus on a network. The same applies to programs of the headphone 10 and a server device 30.

The control unit 1 executes various calculations based on the various programs stored in the storage unit 2 and comprehensively controls each unit of the headphone 10.

The control unit 1 is realized by hardware or a combination of hardware and software. The hardware is configured as a part or all of the control unit 1 and examples of the hardware includes a CPU (Central Processing Unit), a GPU (Graphics Processing Unit), a VPU (Vision Processing Unit), a DSP (Digital Signal Processor), an FPGA (Field Programmable Gate Array), an ASIC (Application Specific Integrated Circuit), or a combination of two or more thereof. The same applies to a control unit 21 of the smartphone 20 and a control unit 31 of the server device 30.

Smartphone 20

As shown in FIG. 1, the smartphone 20 (second device) includes a housing 19 and a display unit 23 provided on a front side of the housing.

Figure 3:
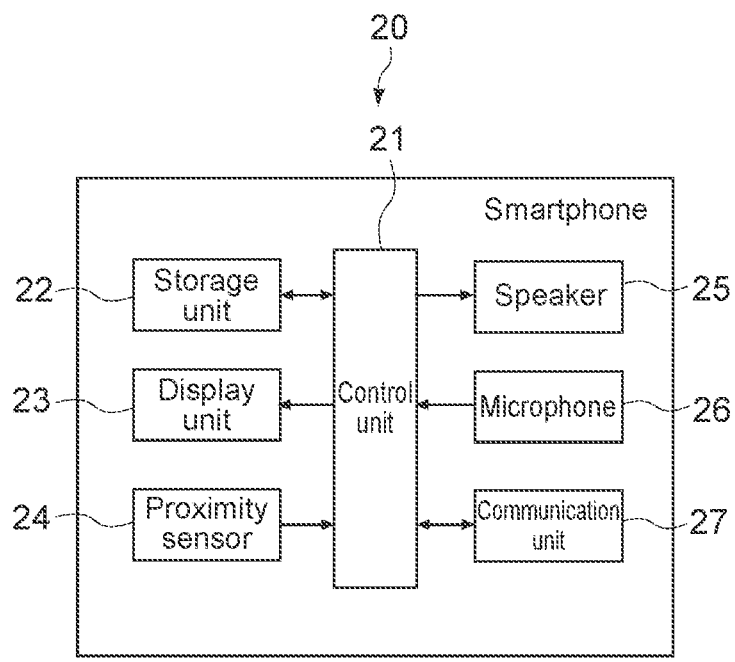
FIG. 3 is a block diagram showing an internal configuration of a smartphone.

FIG. 3 is a block diagram showing an internal configuration of the smartphone 20. As shown in FIG. 3, the smartphone 20 includes a control unit 21, a storage unit 22, the display unit 23, a proximity sensor 24, a speaker 25, a microphone 26, and a communication unit 27.

The display unit 23 includes, for example, a liquid crystal display, an organic EL (Electro Luminescence) display, or the like. The display unit 23 displays various images on a screen under control of the control unit 21.

The proximity sensor 24 is provided on the display unit 23. The proximity sensor 24 detects proximity of a finger of the user to the display unit 23 and outputs a signal indicating that the finger of the user is in proximity and a signal indicating a position where the finger is in proximity to the control unit.

The speaker 25 outputs various sounds such as a voice generated by a call of the other party under the control of the control unit 21. The microphone 26 converts various sounds such as a voice generated by a call of the user into an electric signal and outputs the signal to the control unit 21.

The communication unit 27 is configured to be able to intercommunicate with the headphone 10 wired or wirelessly. In addition, the communication unit is configured to be able to communicate with each server device 30 via the network.

The storage unit 22 includes a non-volatile memory for storing various programs necessary for processing of the control unit 21 and various types of data and a volatile memory used as a work area of the control unit 21.

The control unit 21 executes various calculations based on various programs stored in the storage unit 22 and integrally controls each unit of the smartphone 20.

Server Apparatus 30

As shown in FIG. 1, the server device 30 includes a music distribution server 30a, an analysis server 30b, a metadata server 30c, and a user data server 30d.

Figure 4:
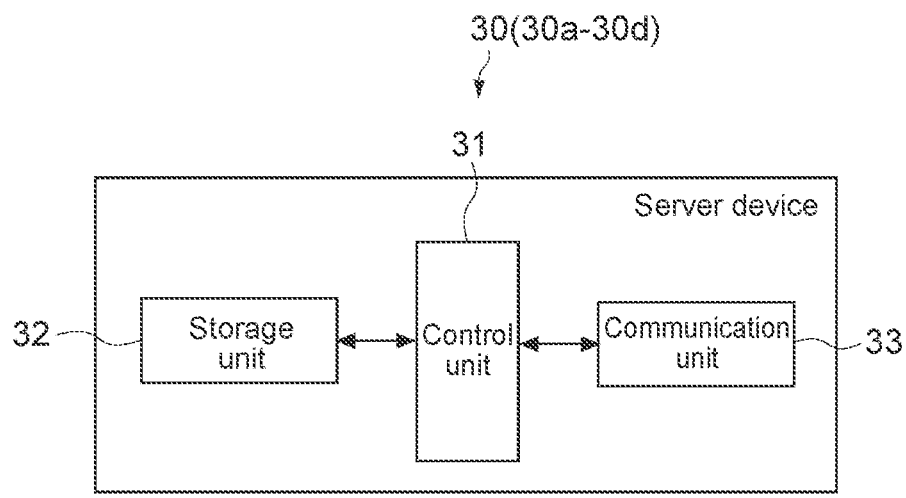
FIG. 4 is a block diagram showing an internal configuration of a server device.

FIG. 4 is a block diagram showing an internal configuration of the server device 30. As shown in FIG. 4, the music distribution server 30a, the analysis server 30b, the metadata server 30c, and the user data server 30d each includes the control unit 31, a storage unit 32, and a communication unit 33.

The communication unit 33 is configured to be able to communicate with the headphone 10 and other server devices 30 via the network.

The storage unit 32 includes a non-volatile memory for storing various programs necessary for processing of the control unit 31 and various types of data and a volatile memory used as a work area of the control unit 31.

The control unit 31 executes various calculations based on various programs stored in the storage unit 32 and comprehensively controls each unit of the server device 30.

Music Distribution Server 30a

The music distribution server 30a distributes (streams) music in response to a request from the smartphone 20.

Analysis Server 30b

The analysis server 30b executes various analysis processing such as metadata analysis. The analysis processing of the analysis server will be described later in detail with reference to FIG. 7 and the like.

Metadata Server 30c

The metadata server 30c stores various kinds of metadata in the music (content). Examples of the metadata include an intro (first introduction part of music), a climax, an outro (last reverberation part of music), a music name, a singer name, an album name in which the music is recorded, and the like. Note that the metadata may be any information as long as it is information related to the music (content).

In particular, in the present embodiment, the metadata server 30c stores an operation acceptance period for accepting a gesture operation (swing, nodding, or the like) by the user. Note that the operation acceptance period will be described below in detail.

User Data Server 30d

The user data server 30d stores various types of user data. The user data includes, for example, information such as a favorite music piece of the user, but the user data may be any information about the user.

In the above description, the cases where the music distribution server 30a, the analysis server 30b, the metadata server 30c, and the user data server 30d are the individual server devices 30 is described, but the configuration of the server devices 30 is not limited thereto. For example, one server device 30 may be responsible for each of the roles of the music distribution server 30a, the analysis server 30b, the metadata server 30c, and the user data server 30d, and two to three or five or more server devices 30 may be responsible for these roles. In addition, the server device 30 does not need to include all of the music distribution server 30a, the analysis server 30b, the metadata server 30c, and the user data server 30d, and some of them can be omitted.

Method of Embodiment

Figure 5:
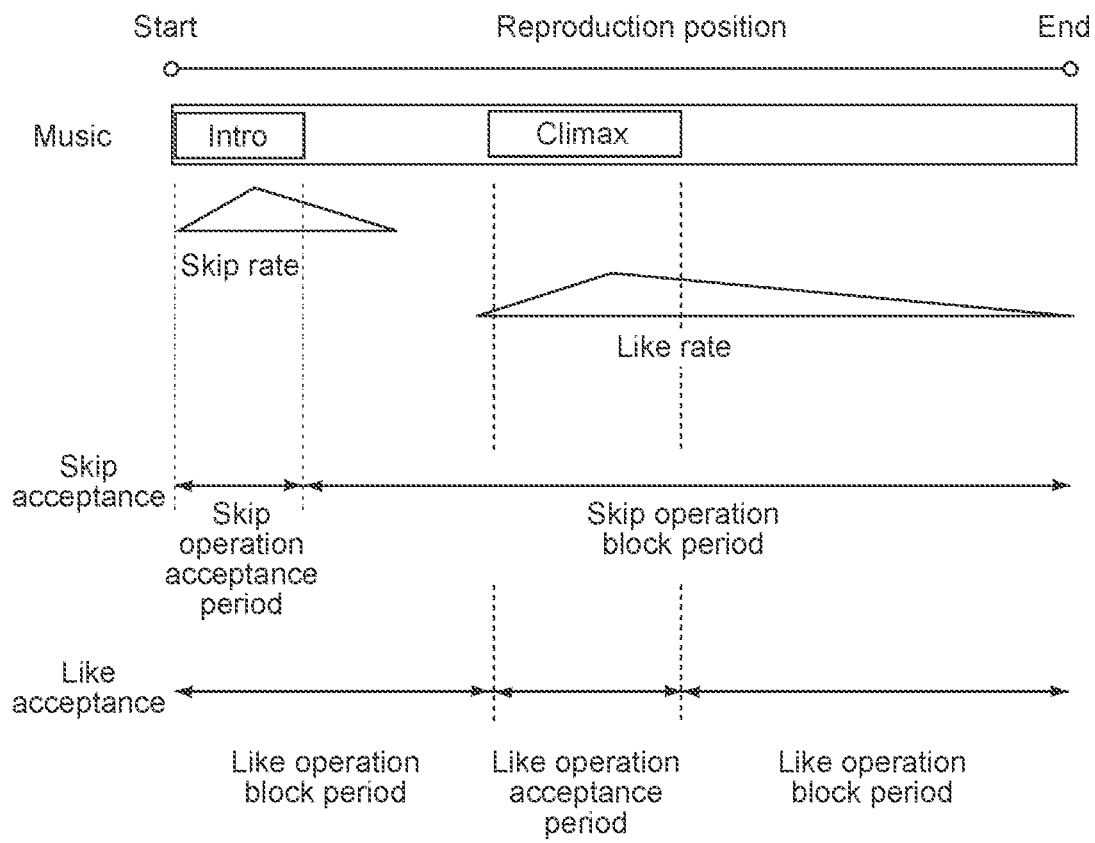
FIG. 5 is a diagram for describing a method used in the first embodiment.

Next, a method used in the present embodiment will be described. FIG. 5 is a diagram for describing a method used in the present embodiment.

As shown in FIG. 5, music (example of reproducible content having predetermined time length) has a reproduction position from a start to an end. In the present embodiment, the "reproduction position" means a position on a time axis in the reproducible content that can be represented by the time axis, specifically, for example, a time from a reproduction start position such as what minute and what second from the reproduction start position (0 seconds) of the content.

Here, processing to be executed by the user operation during music reproduction often changes for each reproduction position.

For example, "Skip rate" and "Like rate" are shown in FIG. 5. In the present embodiment, "Skip" means processing of skipping currently reproduced music and starting reproduction of next music. In addition, "Like" means processing of bookmarking the currently reproduced music as a favorite of the user.

In the present embodiment, the "Skip rate" means frequency at which the music is skipped (fast-forward). In FIG. 5, a time distribution in the Skip rate is represented by a triangular shape, and the higher a height of the triangle, the more frequently the music is skipped.

In addition, in the present embodiment, the "Like rate" means frequency at which the music is liked (bookmarked). In FIG. 5, a time distribution in the Like rate is represented by a triangular shape, and the higher a height of the triangle, the more frequently the music is liked.

Note that, in the present embodiment, Skip=skip music and Like=bookmark, but it is not limited thereto, and Skip=skip N seconds and Like=present music similar to bookmarked music after bookmarking.

As shown in FIG. 5, Skip (skip music) tends to be relatively concentrated in a start part of the music, i.e., a period corresponding to the intro of the music. In particular, in the case of a user using distribution of music in a subscription (service in which music is unlimited to hear for certain period of time due to payment of fixed charge), as the number of available music pieces is large, Skip tends to concentrate on the start part of the music.

In addition, Like (bookmark) tends to be relatively concentrated in a period corresponding to the climax of the music.

Here, it is assumed that the user performs the gesture operation using the head with the headphone 10. For example, it is assumed that an action of swinging the head by the user corresponds to the gesture operation for skipping (Skip operation), and an action of the nodding by the user corresponds to the gesture operation (Like operation) for performing Like.

In this case, there is a problem that it is difficult to accurately distinguish whether the user has performed the swing, the nodding, or the like in order to perform the gesture operation, or whether the user has simply performed the swing, the nodding, or the like in daily life without being related to the gesture operation.

Therefore, there is a problem that, for example, when the user walks on a road and looks at the left and right sides to confirm a vehicle in front of a crosswalk, it is erroneously determined that it is the gesture operation and the music is skipped. In addition, for example, when the user simply looks down to see what is falling on the road while walking on the road, it is erroneously determined that it is the gesture operation and the music is liked (bookmarked).

Therefore, in the present embodiment, as shown in FIG. 5, a Skip operation acceptance period (first operation acceptance period) for accepting the Skip operation is set in the start part of the music that is highly likely to be skipped, that is, in a period corresponding to the intro of the music. For a period that does not correspond to the intro of the music, a Skip operation block period in which the Skip operation is not accepted is set.

Similarly, in the present embodiment, a Like operation acceptance period (first operation acceptance period) in which the Like operation is accepted is set in the part of the music that is highly likely to be liked (bookmarked), e.g., in a period corresponding to the climax. Then, for periods that do not correspond to the climax of the music, Like operation block periods in which no Like operation is accepted are set.

Accordingly, it is considered that it is possible to prevent the user from erroneously determining that the action in the daily life of the user is the gesture operation while appropriately accepting the gesture operation (command) intended by the user and from executing the processing that is not intended by the user.

In the present embodiment, the "Skip operation" means the gesture operation for the user to skip. In the present embodiment, the Skip operation is the swing, but it can be changed as appropriate.

Furthermore, in the present embodiment, the "Like operation" means the gesture operation for the user to perform Like (bookmark). In the present embodiment, the Like operation is the nodding, but it can be changed as appropriate.

In the present embodiment, the swing=Skip operation and the nodding=Like operation are set, but it may be reversed or gesture operations other than the swing and the nodding may be assigned to the Skip operation and the Like operation, for example. In addition, a specific operation may be assigned to a specific gesture by a manual input by the user.

Furthermore, in the present embodiment, the Skip operation and the Like operation are different gesture operations. On the other hand, in the present embodiment, the Skip operation acceptance period corresponding to Skip (first processing) and the Like operation acceptance period corresponding to Like (second processing) are different periods that do not overlap with each other. Therefore, the Skip operation and the Like operation may be the same gesture operation (for example, both are swing, nodding, or the like).

Furthermore, in the present embodiment, the gesture operation by the user may be accepted, for example, when it is determined that a neck of the user is moved to an angle equal to or larger than a predetermined threshold value. The predetermined threshold value may be preset, manually set by the user, or an appropriate angle may be set for each user individual by storing an angle of movement of the neck every time the gesture operation is performed.

Here, in the present embodiment, Skip and Like registration are executed as the processing for the user operation (gesture operation), but the processing for the user operation is not limited thereto. Other examples of the processing include repeating (repeatedly reproducing same music), returning the music (returning to previous music), presenting the music information, pause, and the like.

In addition, in the present embodiment, although it is a configuration that accepts two types of operations: Skip operation and Like operation, it may be a configuration that accepts three or more types of operations selected from, for example, the Skip operation, the Like operation, a repeat operation, a music return operation, a music information presentation operation, and a pause operation. In this case, three or more types of operation acceptance periods (Skip operation acceptance period, Like operation acceptance period, repeat operation acceptance period, music return operation acceptance period, music information presentation operation acceptance period, pause operation acceptance period, and the like) for accepting three or more types of operations are respectively set.

Furthermore, in the present embodiment, the Skip operation acceptance period is a period coinciding with an intro period of the music. However, the Skip operation acceptance period may be slightly deviated from the intro period. Similarly, in the present embodiment, the Like operation acceptance period is a period coinciding with a climax period of the music, but the Like operation acceptance period may be slightly deviated from the climax period.

For example, as shown in FIG. 5, the time distribution in the Like rate does not completely coincide with the climax period, and Like (bookmark) may be performed with a certain probability even when the climax ends. Therefore, for example, an end position of the Like operation acceptance period may be set slightly later than an end position of the climax.

In the present embodiment, the Skip operation acceptance period is set for the intro part of the music and the Like operation acceptance period is set for the climax part of the music, but it is not limited thereto. For example, in the case of the music in which a beginning part of the music is the climax, it is assumed that the Skip rate in the intro is relatively low, and conversely, the Like rate is relatively high. Therefore, the Like operation acceptance period may be set for the intro part, the Skip operation acceptance period may be set for an interval after the climax is ended, or the like, and the operation acceptance periods of Skip, Like, or other operations (repeat, music return, music information presentation, pause, etc.) may be individually set for each music piece, or may be set for a plurality of music pieces having similar tendencies by analyzing the metadata of the music, or may be manually set by the user.

Description of Action

Hereinafter, each processing in the information processing system 100 will be described.

Figure 6:
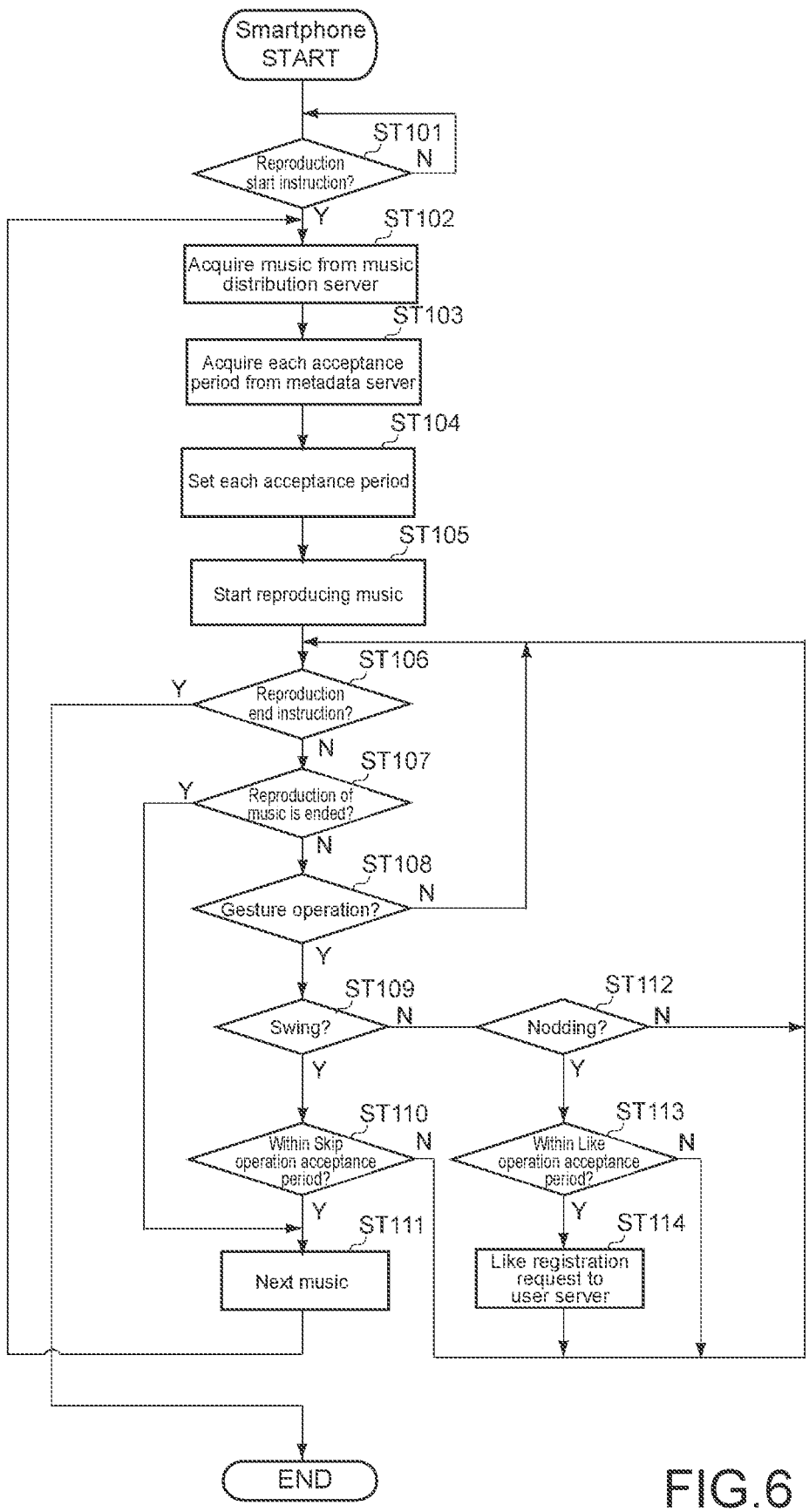
FIG. 6 is a flowchart showing processing executed by the smartphone.

FIG. 6 is a flowchart showing processing executed by the smartphone 20.

First, the control unit 21 of the smartphone 20 (hereinafter, abbreviated as "smartphone 20" in description of processing) determines whether or not a reproduction start instruction for starting reproduction of the music is input from the user (Step 101).

The reproduction start instruction may be, for example, the gesture operation using the head, an operation of tapping the display unit 23 of the smartphone 20, or the like. Typically, the reproduction start instruction may be input by any operation by the user.

If the reproduction start instruction is input (YES in Step 101), the smartphone 20 transmits a music acquisition request to the music distribution server 30*a* to acquire the music from the music distribution server 30*a* (via streaming) (Step 102).

Next, the smartphone 20 acquires the Skip operation acceptance period and the Like operation acceptance period of the corresponding music from the metadata server 30*c* (Step 103). Note that each operation acceptance period is generated in advance by the analysis server 30*b*, and each generated operation acceptance period is stored in advance in the metadata server 30*c*. This processing will be described later in detail with reference to FIG. 7.

When each operation acceptance period is acquired from the metadata server 30c, the smartphone 20 then sets the Skip operation acceptance period with respect to the reproduction position and sets the Skip operation block period in a period out of the Skip operation acceptance period (Step 104) (see FIG. 5). Furthermore, the smartphone 20 sets the Like operation acceptance period with respect to the reproduction position and sets the Like operation block period in a period out of the Like operation acceptance period. Then, the smartphone 20 starts reproducing the music (Step 105).

Next, the smartphone 20 determines whether or not a reproduction end instruction for ending reproduction of the music is input from the user (Step 106).

The reproduction end instruction may be, for example, the gesture operation using the head, the operation of tapping the display unit 23 of the smartphone 20, or the like. Typically, the reproduction start instruction may be input by any operation by the user.

If the reproduction end instruction is input (YES in Step 106), the smartphone 20 ends the reproduction of the music and ends the processing.

On the other hand, when the reproduction end instruction is not input (NO in Step 106), the smartphone 20 determines whether or not the reproduction of the currently reproduced music is ended (Step 107).

If the reproduction of the currently reproduced music is ended (YES in Step 107), the smartphone 20 shifts to the next music (Step 111), returns to Step 102 and acquires the next music from the music distribution server 30a (via streaming).

In Step 107, when the reproduction of the currently reproduced music is not ended (that is, when music is reproduced) (NO in Step 107), the smartphone 20 proceeds to next Step 108. In Step 108, the smartphone 20 determines whether or not the gesture operation is input by the user.

If no gesture operation is input (NO in Step 108), the smartphone 20 returns to Step 106 and determines whether or not the reproduction end instruction of music is input from the user.

On the other hand, when the gesture operation is input by the user (YES in Step 108), the smartphone 20 determines whether or not the gesture operation is the swing (Step 109). If the gesture operation is the swing (YES in Step 109), the smartphone 20 determines whether or not it is currently within the Skip operation acceptance period (see FIG. 5) (Step 110).

If it is currently within the Skip operation acceptance period (YES in Step 110), the smartphone 20 stops reproducing the currently reproduced music and skips to the next music (Step 111). Then, the smartphone 20 returns to Step 102 to acquire the following music from the music distribution server 30a (via streaming).

In Step 110, if it is not currently within the Skip operation acceptance period (NO in Step 110), that is, if it is currently within the Skip operation block period, the smartphone 20 returns to Step 106 without accepting the Skip operation (swing).

In Step 109, if the gesture operation is not the swing (NO in Step 109), the smartphone 20 proceeds to Step 112. In Step 112, the smartphone 20 determines whether or not the gesture operation is the nodding.

If the gesture operation is the nodding (YES in Step 112), the smartphone 20 determines whether or not it is currently within the Like operation acceptance period (see FIG. 5) (Step 113).

If it is currently within the Like operation acceptance period (YES in Step 113), the smartphone 20 transmits a Like registration request (bookmark request) to the user data server 30d (Step 114).

The Like registration request includes a user ID, a music ID, and the like. The user data server 30d stores the music associated with the user in response to the Like registration request and performs the Like registration. The user data server 30d performs the Like registration for each user and manages the Like registration for each user.

In Step 113, if it is not currently within the Like operation acceptance period (NO in Step 113), that is, if it is currently within the Like operation block period, the smartphone 20 returns to Step 106 without accepting the Skip operation (swing).

Generating Each Operation Acceptance Period

Figure 7:
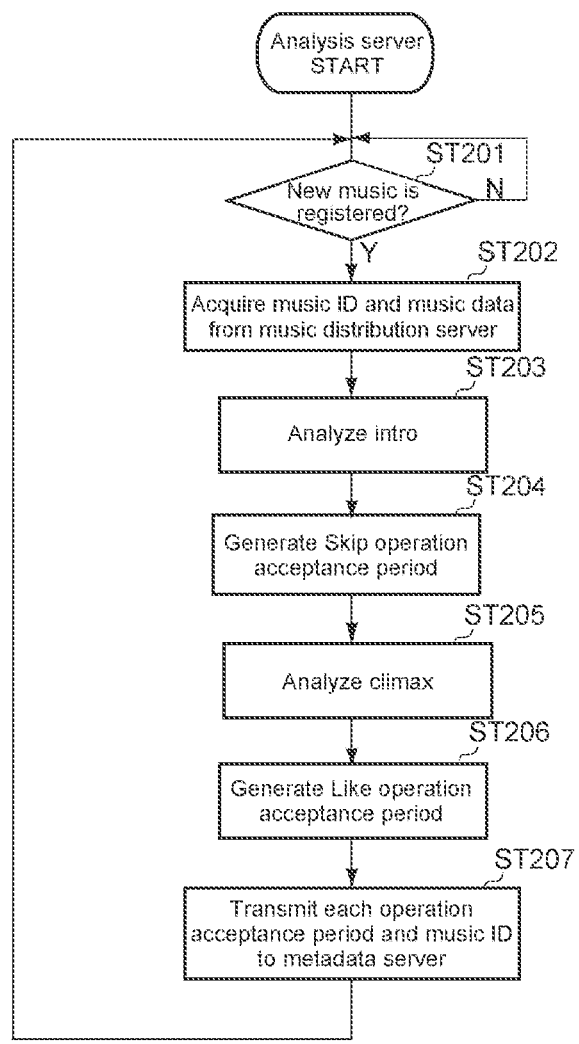
FIG. 7 is a flowchart showing processing of generating each operation acceptance period executed by an analysis server.

Next, processing of generating each operation acceptance period executed by the analysis server 30b will be described. FIG. 7 is a flowchart showing processing of generating each operation acceptance period executed by the analysis server 30b.

First, the control unit 31 of the analysis server 30b (hereinafter, abbreviated as analysis server 30b in description of processing) determines whether or not new music is registered in the music distribution server 30a (Step 201). If the new music is registered in the music distribution server 30a (YES in Step 201), the analysis server 30b acquires the music ID and the music data of the registered music from the music distribution server 30a (Step 202).

Next, the analysis server 30b performs intro analysis of the music data to analyze which part of the music data is a period corresponding to the intro (Step 203). Then, the analysis server 30b generates the period corresponding to the intro (that is, metadata) as the Skip operation acceptance period (Step 204).

Next, the analysis server 30b performs a climax analysis of the music data to analyze which part of the music data is a period corresponding to the climax (Step 205). Then, the analysis server 30b generates the period corresponding to the climax (that is, metadata) as the Like operation acceptance period (Step 206).

After generating the Skip operation acceptance period, the analysis server 30b transmits each generated operation acceptance period and the music ID to the metadata server 30c (Step 207). The metadata server 30c manages each operation acceptance period for each music piece by storing each operation acceptance period received from the analysis server 30b associated with the music ID.

The analysis server 30b transmits each generated operation acceptance period and the music ID to the metadata server 30c and then returns to Step 201 to determine whether or not the new music is registered in the music distribution server 30a.

With such processing, each time the music is newly registered, the Skip operation acceptance period and the Like operation acceptance period corresponding to the music are generated by the analysis server 30b (based on metadata) and stored in the metadata server 30c.

The user may manually set the Skip operation acceptance period and the Like operation acceptance period based on the analysis result of the analysis server 30b.

Here, an intro length, a climax length, and a climax position are different for each music piece. Therefore, a length of the Skip operation acceptance period, a length and a position of the Like operation acceptance period are different for each music piece. Therefore, in the present embodiment, the lengths and the positions of the Skip operation acceptance period and the Like operation acceptance period are variable for each music piece (for position, in particular, Like operation acceptance period).

Effects and Others

In the present embodiment, when the user performs the gesture operation in the Skip operation acceptance period, that is, in the period corresponding to the intro of the music, Skip processing of the music is executed. In addition, if the user performs the gesture operation in the Like operation acceptance period, that is, in the period corresponding to the climax of the music, Like processing (bookmarking) of the music is executed.

That is, in the present embodiment, different processing is executed for the gesture operation of the user (user operation) in accordance with the reproduction position of reproducible music (content). As a result, each processing that appropriately reflects the intention of the user can be executed in accordance with the reproduction position of the music (content).

Furthermore, in the present embodiment, the Skip operation acceptance period and the Like operation acceptance period are set based on the time distribution of the frequency (Skip rate, Like rate) at which the Skip operation and the Like operation are performed. As a result, it is possible to execute each processing that more appropriately reflects the intention of the user in accordance with the reproduction position.

Furthermore, in the present embodiment, the Skip operation acceptance period is a period corresponding to the intro of the music, and the Like operation acceptance period is a period corresponding to the climax of the music. As a result, it is possible to execute each processing that more appropriately reflects the intention of the user in accordance with the reproduction position.

Furthermore, in the present embodiment, the lengths and the positions of the Skip operation acceptance period and the Like operation acceptance period are variable for each music piece (since lengths and positions of intro and climax are different for each music piece). As a result, the length and the position of each operation acceptance period can be appropriately set.

Furthermore, in the present embodiment, the period out of the Skip operation acceptance period is the Skip operation block period in which the Skip operation is not accepted. As a result, it is possible to prevent the user from erroneously determining that the action in the daily life of the user is the gesture operation while appropriately accepting the gesture operation (input command) intended by the user, and from executing the processing that is not intended by the user.

Second Embodiment

Next, a second embodiment of the present technology will be described. In the description of the second embodiment, first, variations in each music piece such as the Skip rate and the Like rate will be described.

Figure 8:
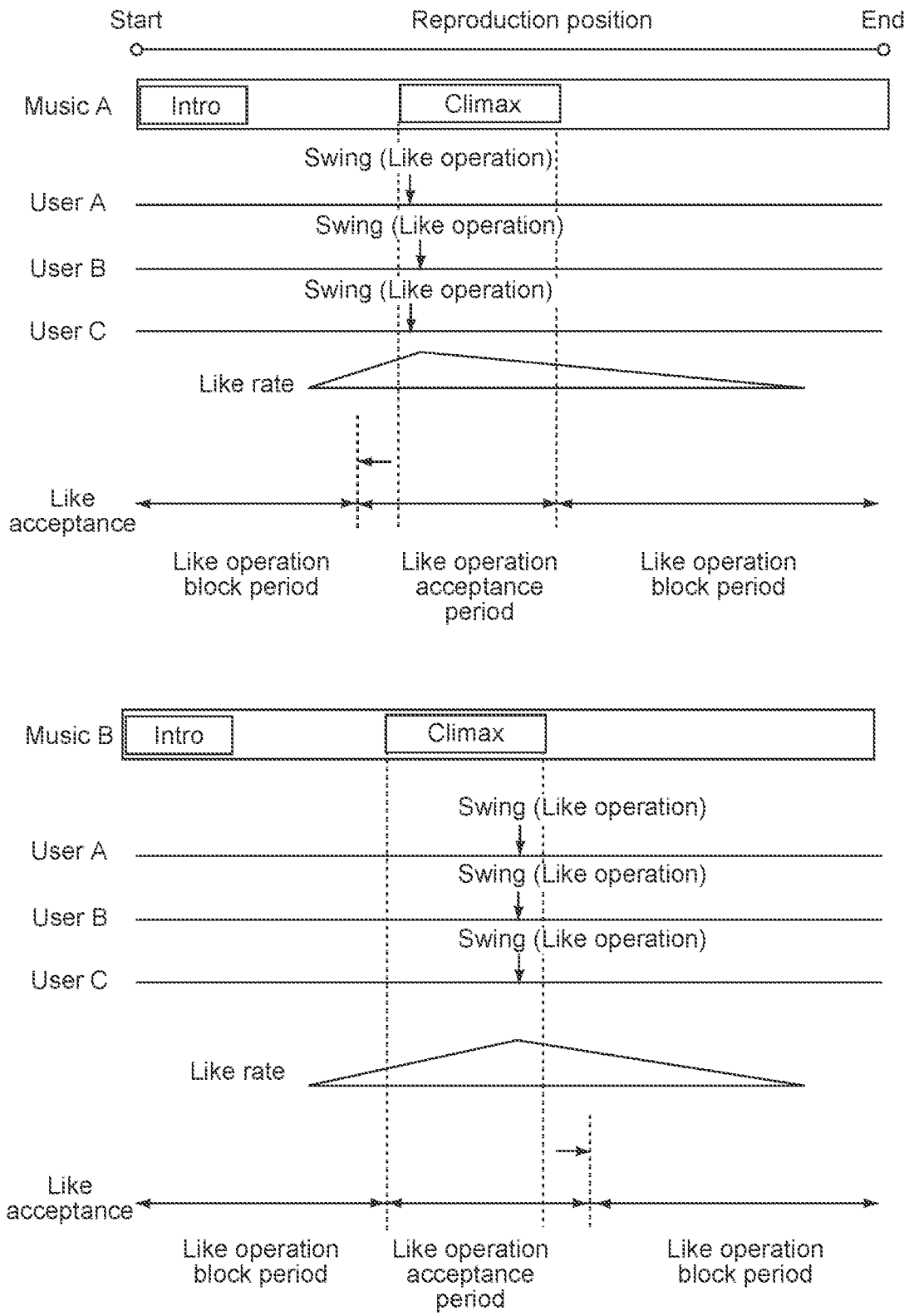
FIG. 8 is diagrams showing variations in a Like rate for each music piece.

FIG. 8 is a diagram showing variations in the Like rate for each music piece. On the upper side of FIG. 8, the time distribution of the Like rate in the music A is shown. On the other hand, in the lower side of FIG. 8, the time distribution of the Like rate in the music B is shown. Note that, in the description herein, from the Skip rate and the Like rate, the Like rate will be representatively described.

Referring to the upper side of FIG. 8, there is a tendency in Music A, for each user of users A, B, C, . . . and the like, to concentrate the Like operation (nodding) immediately after the start of the climax of music. In this case, if the start position of the Like operation acceptance period coincides with the start position of the climax, there is a possibility that the Like operation (intention) of the user cannot be appropriately detected.

Therefore, in such a case, in the second embodiment, processing is executed in which the start position of the Like operation acceptance period is shifted to forward from the start position of the climax.

Referring to the lower side of FIG. 8, there is a tendency in Music B, for each user of users A, B, C . . . and the like, to concentrate the Like operation (nodding) immediately before the end of the climax of music. In this case, if the start position of the Like operation acceptance period coincides with the end position of the climax, there is a possibility that the Like operation (intention) of the user cannot be appropriately detected.

Therefore, in such a case, in the second embodiment, processing is executed in which the end position of the Like operation acceptance period is shifted to backward of the end position of the climax.

That is, in the second embodiment, the length of each operation acceptance period (already set) is variably controlled for each music piece based on the time distribution (triangular shape) of the frequency (Like rate) of the gesture operation (user operation).

Note that the positions of the operation acceptance periods may be shifted to forward and backward directions while the lengths thereof remain constant. That is, the position of each operation acceptance period (already set) may be variably controlled for each music piece based on the distribution (triangular shape).

In addition, based on the distribution (triangular shape), both the length and the position of each operation acceptance period (already set) may be variably controlled for each music piece.

Description of Action

Figure 9:
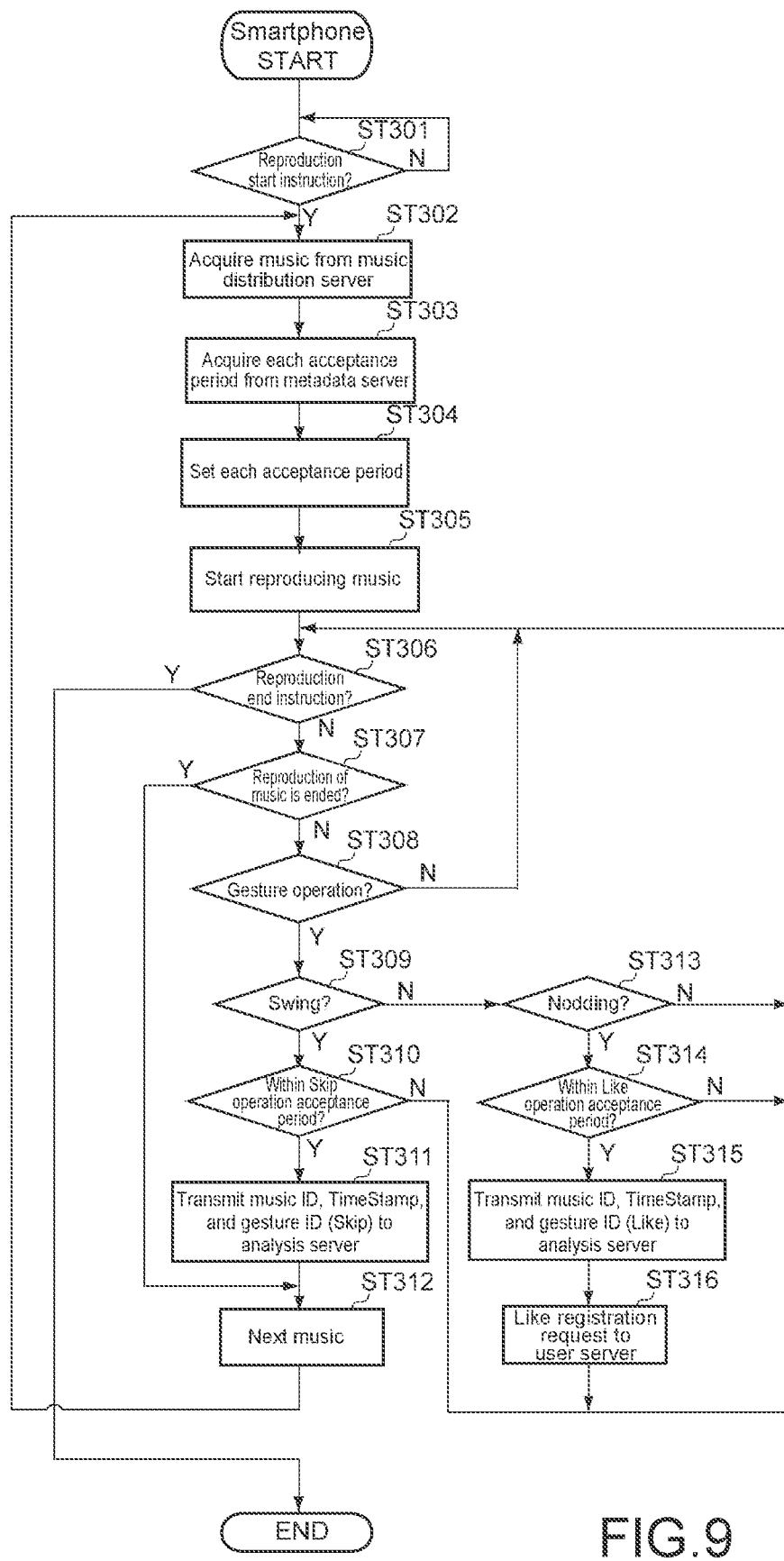
FIG. 9 is a flowchart showing processing executed by the smartphone in a second embodiment.

FIG. 9 is a flowchart showing processing executed by the smartphone 20 in the second embodiment.

The flowchart shown in FIG. 9 (second embodiment) is largely the same as the flowchart shown in FIG. 6 (first embodiment), but the flowchart shown in FIG. 9 is different from the flowchart shown in FIG. 6 in that Step 311 and Step 315 are added.

If the gesture operation is the swing (YES in Step 309) and is currently within the Skip operation acceptance period (YES in Step 310), the smartphone 20 proceeds to Step 311. In Step 311, the smartphone 20 transmits the music ID, a time stamp, and a gesture ID (Skip) to the analysis server 30b. Then, the smartphone 20 skips the currently reproduced music (Step 312) and returns to Step 302.

Here, the time stamp is information indicating timing at which the gesture operation by the user is performed corresponding to which reproduction position of the music and is information such as what minute and what second from the start position of the music. For example, when the swing is performed at a position of 3 seconds from the starting position of the music, the information of 3 seconds is transmitted to the analysis server 30b as the time stamp.

In addition, the gesture ID is used to identify the gesture operation for causing the gesture operation of the user to perform which processing. Note that, in Step 311, the gesture operation of the user is a gesture operation for executing Skip processing, and thus Skip information is transmitted as the gesture ID to the analysis server 30b.

If the gesture operation is the nodding (YES in Step 313) and is currently within the Like operation acceptance period (YES in Step 314), the smartphone 20 proceeds to Step 315. In Step 315, the smartphone 20 transmits the music ID, the time stamp, and the gesture ID (Like) to the analysis server 30b. Then, the smartphone 20 transmits the Like registration request to the user data server 30d (Step 316) and returns to Step 306.

In this case, for example, when the nodding is performed at a position one minute from the starting position of the music, information about one minute is transmitted to the analysis server 30b as the time stamp. In addition, in this case, since the gesture operation of the user is a gesture operation causing the Like processing to be performed, information about Like is transmitted as a gesture ID to the analysis server 30b.

Note that the music ID, the time stamp, and the gesture ID are transmitted to the analysis server 30b in order to generate the time distribution of the Skip rate and the time distribution of the Like rate (see FIG. 8) in the analysis server 30b.

Here, FIG. 9 shows a case in which the music ID, the time stamp, and the gesture ID (Skip or Like) are transmitted to the analysis server 30b only when the corresponding gesture operation is performed (that is, when Skip or Like is performed) within each operation acceptance period.

On the other hand, when the corresponding gesture operation is performed, regardless of whether the timing at which the corresponding gesture operation is performed is within the operation acceptance period or the operation block period, the music ID, the time stamp, and the gesture ID (Skip or Like) may be uniformly transmitted to the analysis server 30b.

Change (Update) of Each Operation Acceptance Period

Figure 10:
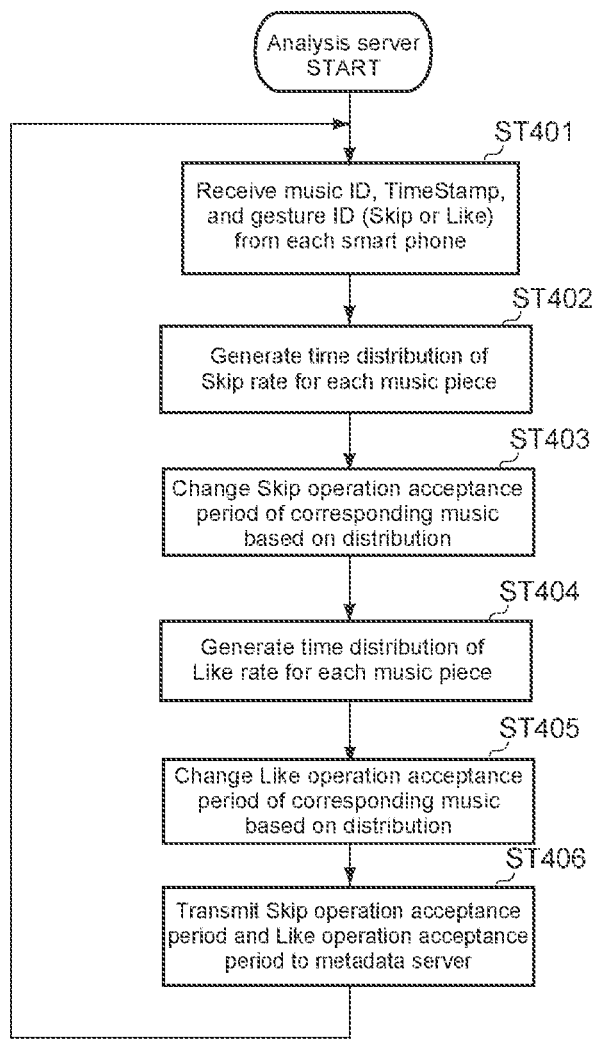
FIG. 10 is a flowchart showing processing executed by the analysis server in the second embodiment.

Next, change processing or the like of the Skip operation acceptance period and the Like operation acceptance period executed by the analysis server 30b will be described. FIG. 10 is a flowchart showing processing executed by the analysis server 30b in the second embodiment.

First, the analysis server 30b receives and collects information about the music ID, the time stamp, and gesture ID (Skip or Like) from the smartphone 20 (Step 401). Next, the analysis server 30b generates the time distribution of the Skip rate for each music piece based on the time stamp associated with the gesture ID of Skip and the music ID (Step 402).

Next, the analysis server 30b changes (updates) the Skip operation acceptance period as needed based on the time distribution of the Skip rate.

In this case, for example, when the frequency of Skip is concentrated on forward of the Skip operation acceptance period, the end position of the Skip operation acceptance period may be moved to forward to shorten the Skip operation acceptance period.

Furthermore, for example, when the frequency of Skip is concentrated on backward of the Skip operation acceptance period, the end position of the Skip operation acceptance period may be moved to backward to increase the Skip operation acceptance period. Furthermore, in this case, the position of the Skip operation acceptance period may be shifted to backward while the length of the Skip operation acceptance period remains constant.

Next, the analysis server 30b generates the time distribution of the Like rate for each music piece based on the time stamp associated with the like gesture ID and the music ID (Step 404).

Next, the analysis server 30b changes (updates) the Like operation acceptance period as needed based on the time distribution of the Like rate (Step 405).

In this case, for example, in a case in which the frequency of Like is concentrated on forward of the Like operation acceptance period (see upper side of FIG. 8), the start position of the Like operation acceptance period may be moved to forward to increase the Like operation acceptance period. Furthermore, in this case, the Like operation period may be shifted to forward while the length of the Like operation acceptance period remains constant.

Furthermore, for example, in a case in which the frequency of Like is concentrated on backward of the Like operation acceptance period (see lower side of FIG. 8), the end position of the Like operation acceptance period may be moved to backward to increase the Skip operation acceptance period. Furthermore, in this case, the position of the Skip operation acceptance period may be shifted to backward while the length of the Skip operation acceptance period remains constant.

Next, the analysis server 30b transmits the Skip operation acceptance period and the Like operation acceptance period together with the corresponding music ID to the metadata server 30c. The metadata server 30c stores the Skip operation acceptance period and the Like operation acceptance period for each music piece and manages them for each music piece.

In the second embodiment, it is possible to appropriately change the lengths, the positions, and the like of the Skip operation acceptance period and the Like operation acceptance period in accordance with the time distribution of the Skip rate for each music piece and the time distribution of the Like rate for each music piece.

In the description of the second embodiment, since there is a possibility that the time distribution of the Skip rate and the time distribution of the Like rate may change for each music piece, a case is described in which the position, the length, and the like of each operation acceptance period are changed for each music piece in order to cope with this.

On the other hand, the time distribution of the Skip rate and the time distribution of the Like rate may change for each user. For example, user A may be more concentrated in the first half of the intro than in other users, and user B may be more concentrated in the second half of the intro than in other users.

Therefore, the position, the length, and the like of each operation acceptance period may be changed for each user. In this case, the analysis server 30b statistically acquires, for each user, the time distribution of the Skip rate and the time distribution of the Like rate by the user individual and changes the position, the length, and the like of each operation acceptance period for each user based on the time distribution.

Note that the position, the length, and the like of the Skip operation acceptance period or the Like operation acceptance period may be changed, for example, based on the metadata such as a recommendation level of the music. For example, the higher the recommendation level, the shorter (or longer) the Skip operation acceptance period is. Furthermore, for example, the higher the recommendation level, the longer the Like operation acceptance period is.

In the second embodiment, a case is described in which the time distribution of the Skip rate or the Like rate is collected and statistically measured in this system. On the other hand, it is also possible to collect and statistically measure information about the timing of the Skip operation or the Like operation or the like when the user reproduces the music in each device (headphone, smartphone, PC, audio device, or the like) by using a common music application or the like, and to reflect the information on the time distribution of the Skip rate, the Like rate, or the like.

Third Embodiment

Next, a third embodiment of the present technology will be described. In the first embodiment and the second embodiment described above, a case is described in which the length, the position, and the like of each operation acceptance period are different for each music piece. On the other hand, in the third embodiment, a case in which the length, the position, and the like of each operation acceptance period are common (fixed) to all music pieces will be described.

Figure 11:
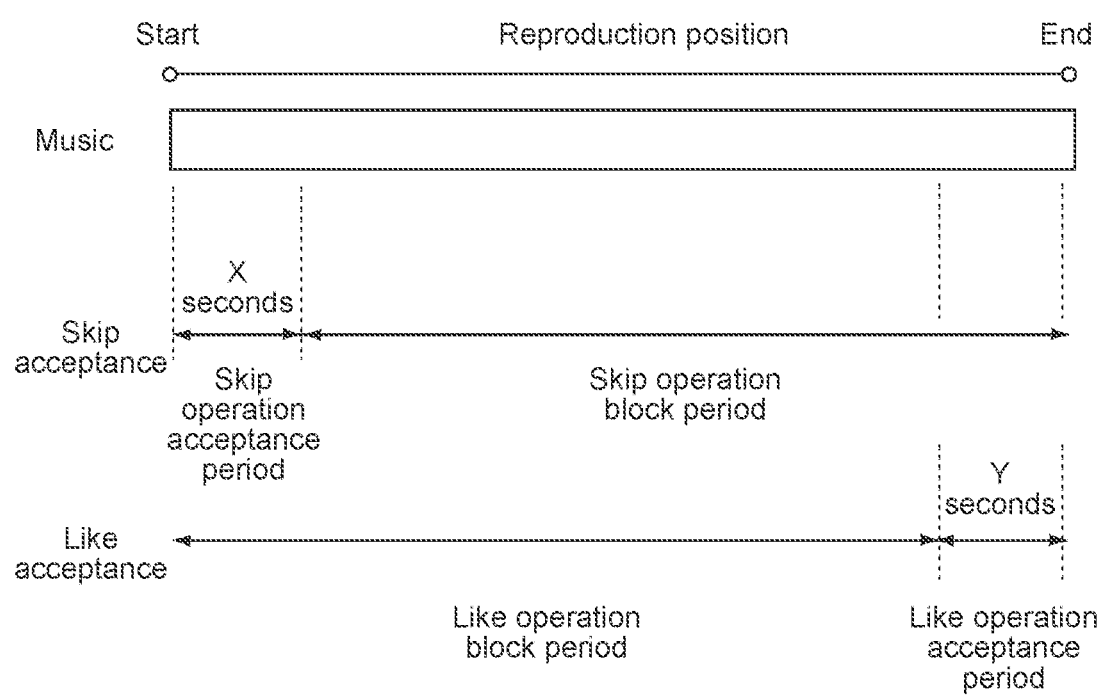
FIG. 11 is a diagram showing a Skip operation acceptance period and a Like operation acceptance period in a third embodiment.

FIG. 11 is a diagram showing the Skip operation acceptance period and the Like operation acceptance period in the third embodiment.

As shown in FIG. 11, in the third embodiment, the Skip operation acceptance period is a period from the reproduction start position (0 seconds) to X seconds (for example, about 3 seconds to 10 seconds), and the other period is the Skip operation block period. Furthermore, in the third embodiment, the Like operation acceptance period is a period from Y seconds (for example, about 3 seconds to 10 seconds) before the reproduction end position to the reproduction end position, and the other period is the Like operation block period.

In the third embodiment, the length and position of each of the Skip operation acceptance period and the Like operation acceptance period are common to all music pieces.

Figure 12:
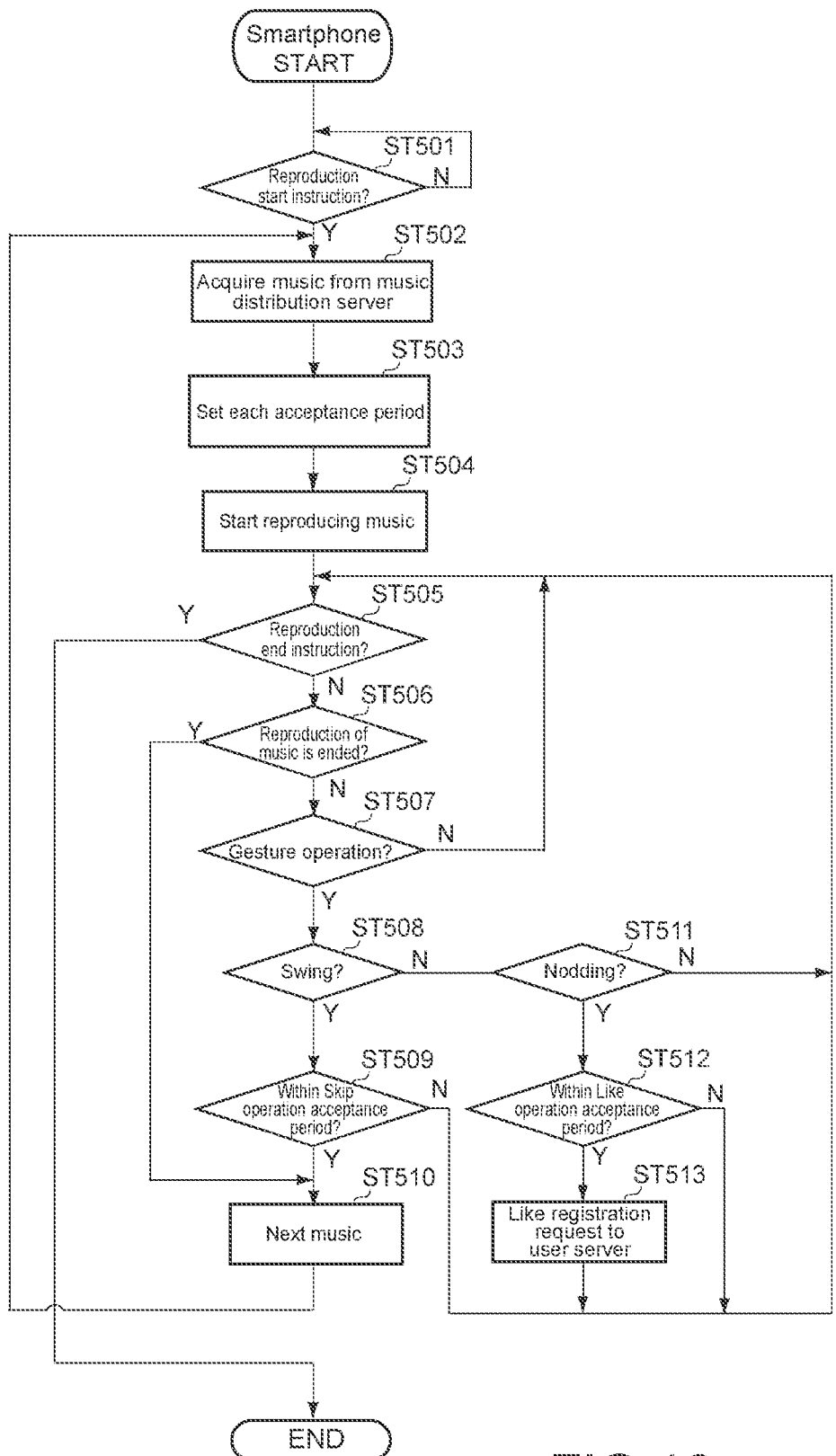
FIG. 12 is a flowchart showing processing executed by the smartphone in the third embodiment.

FIG. 12 is a flowchart showing processing executed by the smartphone 20 in the third embodiment.

The flowchart shown in FIG. 12 (third embodiment) is largely the same as the flowchart shown in FIG. 6 (first embodiment), but the flowchart shown in FIG. 12 is different from the flowchart shown in FIG. 6 in that the processing corresponding to Step 103 in FIG. 6 is not executed.

Specifically, in the third embodiment, the smartphone 20 does not execute processing (Step 103) of receiving each operation acceptance period from the metadata server 30c. This is because, in the third embodiment, the lengths and the positions of the Skip operation acceptance period and the Like operation acceptance period are the same for all music pieces, so that the analysis server 30b performs the intro analysis or the like to generate each operation acceptance period and does not need to be stored in the metadata server 30c. That is, it is sufficient to set each operation acceptance period at a predetermined position and length on the smartphone 20.

As will be understood from the description here, in the third embodiment, the analysis server 30b and the metadata server 30c can be omitted.

As shown in FIG. 12, when the user gives the reproduction start instruction (YES in Step 501), the smartphone 20 acquires the music from the music distribution server 30a (Step 502). Next, the smartphone 20 sets the Skip operation acceptance period and the Like operation acceptance period to predetermined position and length in the music (Step 503).

At this time, as shown in FIG. 11, the smartphone 20 sets the Skip operation acceptance period in a period from the reproduction start position (0 seconds) to X seconds (for example, about 3 seconds to 10 seconds) and sets the Skip operation block period in other periods. Furthermore, for example, the smartphone 20 sets the Like operation acceptance period in a period from Y seconds (for example, about 3 seconds to 10 seconds) before the reproduction end position to the reproduction end position and sets the Like operation block period in other periods.

The other processing is typically the same as in FIG. 6 (first embodiment).

Fourth Embodiment

Figure 13:
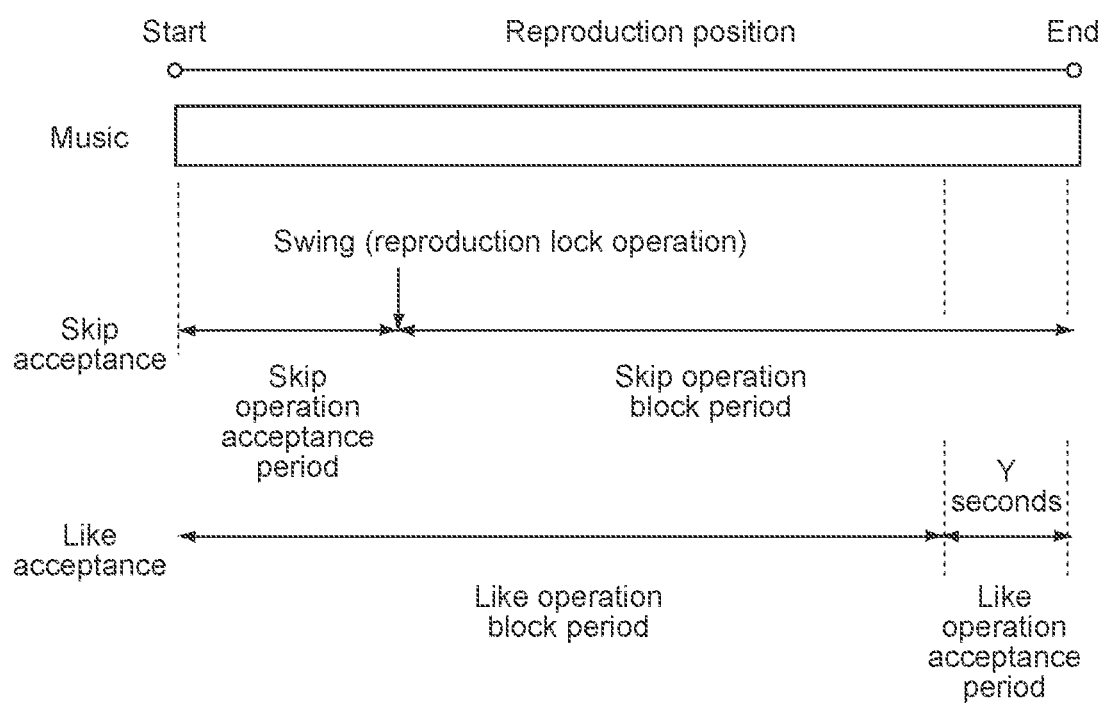
FIG. 13 is a diagram showing the Skip operation acceptance period and the Like operation acceptance period in a fourth embodiment.

Next, a fourth embodiment of the present technology will be described. FIG. 13 is a diagram showing the Skip operation acceptance period and the Like operation acceptance period in the fourth embodiment.

In the fourth embodiment, in particular, the Skip operation acceptance period is different from each of the above-described embodiments, and the Skip operation acceptance period is a period from the reproduction start position of the music to a reproduction lock operation performed by the user.

The reproduction lock operation is a gesture operation for the user to lock (i.e., continue reproduction) the reproduction of the currently reproduced music. In the fourth embodiment, the reproduction lock operation is the action of the nodding by the user, but this can be changed as appropriate.

That is, in the fourth embodiment, the Skip operation acceptance period is a period from the start of reproduction of the music to user nodding, and the end position of the Skip operation acceptance period is not determined in advance.

Figure 14:
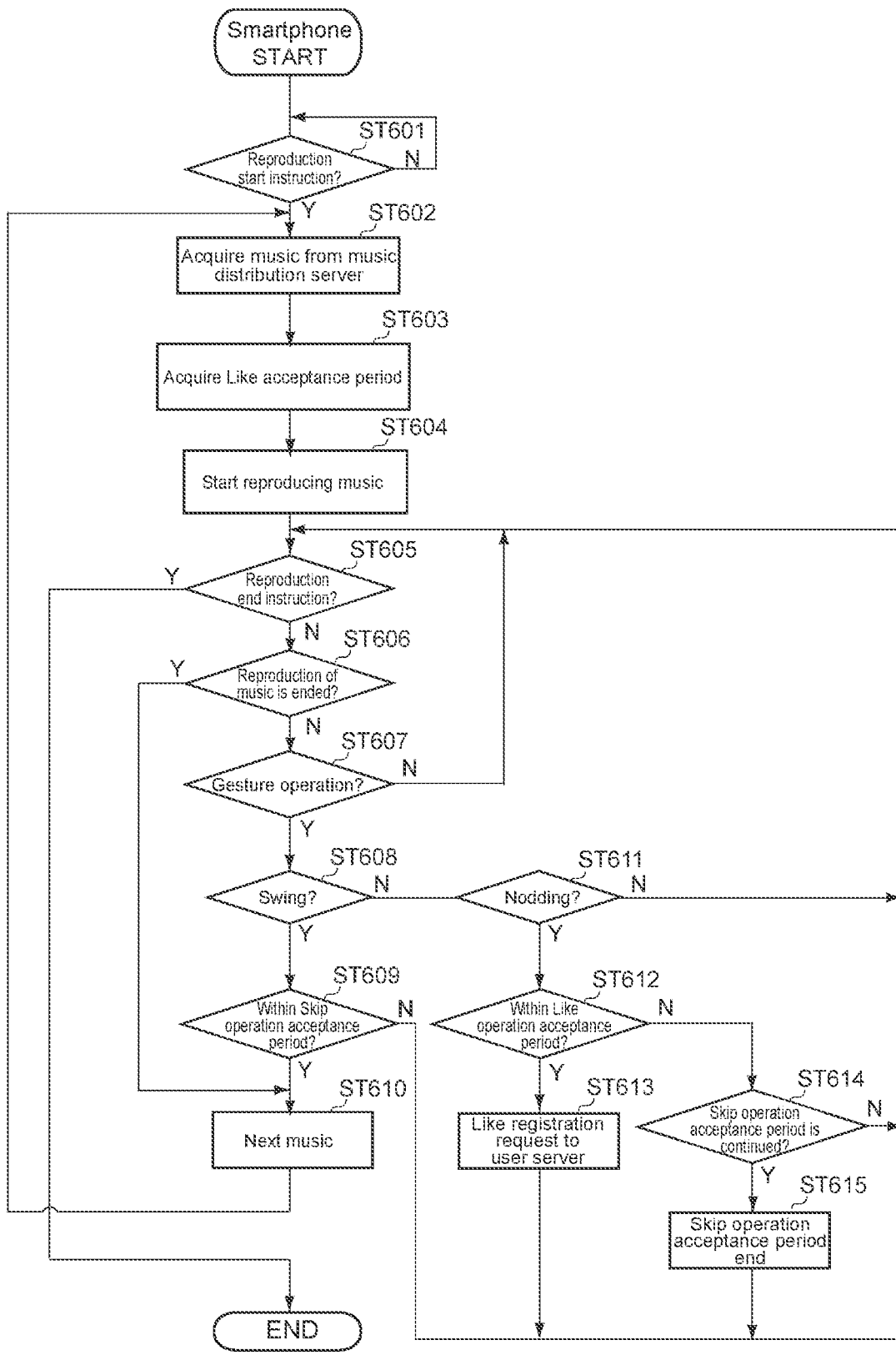
FIG. 14 is a flowchart showing processing executed by the smartphone in the fourth embodiment.

FIG. 14 is a flowchart showing processing executed by the smartphone 20 in the fourth embodiment.

If the reproduction start instruction is input from the user (YES in Step 601), the smartphone 20 acquires the music from the music distribution server 30a (Step 602). Next, the smartphone 20 sets the Like operation acceptance period to the predetermined position and length in the music (Step 603).

At this time, for example, as shown in FIG. 13, the smartphone 20 sets the Like operation acceptance period in the period from Y seconds (for example, about 3 seconds to 10 seconds) before the reproduction end position to the reproduction end position and sets the Like operation block period in the other period.

Note that, in the description herein, a case is described in which the position and the length of the Like operation acceptance period are fixed, but the position and the length of the Like operation acceptance period may be variable in accordance with the position of the climax of the music (Like operation acceptance period may correspond to any of above-described embodiments).

Next, the smartphone 20 starts reproducing the music (Step 604) and determines whether or not the gesture operation by the user is input (Step 607) if there is no reproduction end instruction from the user (NO in Step 605) and the reproduction of the music is not ended (NO in Step 606).

If the gesture operation is input (YES in Step 607), the smartphone 20 determines whether or not the gesture operation is the swing (Step 608). If the gesture operation is the swing (YES in Step 608), the smartphone 20 determines whether or not it is currently within the Skip operation acceptance period (Step 609).

Then, if it is currently the Skip operation acceptance period (YES in Step 609), the smartphone 20 skips the music (Step 610). On the other hand, if it is the Skip operation block period (NO in Step 609), the smartphone 20 does not skip the music.

If the gesture operation input by the user is the nodding (YES in Step 611), the smartphone 20 determines whether or not it is currently the Like operation acceptance period (Step 612).

Then, if it is currently the Like operation acceptance period (YES in Step 612), the smartphone 20 transmits the Like registration request of the music to the user data server 30d (Step 613). On the other hand, if it is the Like operation block period (NO in Step 612), the processing proceeds to Step 614 without transmitting the Like registration request of the music.

In Step 614, the smartphone 20 determines whether or not the Skip operation acceptance period is currently continued. If the Skip operation acceptance period is continued (YES in Step 614), the smartphone 20 ends the Skip operation acceptance period (Step 615) and returns to Step 605.

In Step 614, if the Skip operation acceptance period is already ended (NO in Step 614), that is, if the user already nodded and performed the reproduction lock operation, the smartphone 20 returns to Step 605.

In the fourth embodiment, a reproduction lock state can be set when the user nods at an arbitrary timing.

Fifth Embodiment

Figure 15:
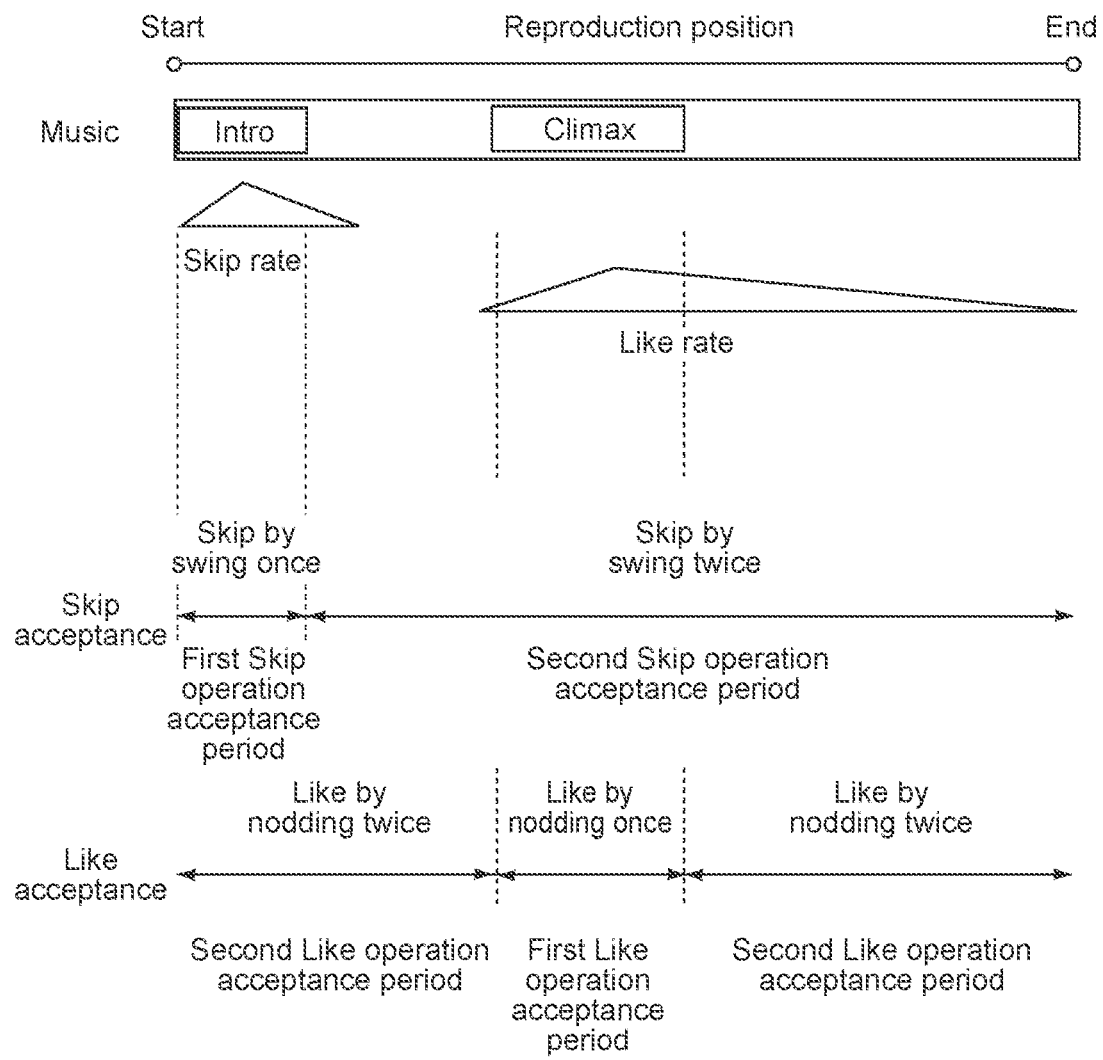
FIG. 15 is a diagram showing the Skip operation acceptance period and the Like operation acceptance period in a fifth embodiment.

Next, a fifth embodiment of the present technology will be described. FIG. 15 is a diagram showing the Skip operation acceptance period and the Like operation acceptance period in the fifth embodiment.

In the fifth embodiment, a first Skip operation acceptance period and a second Skip operation acceptance period are prepared as the Skip operation acceptance period. Furthermore, as the Like operation acceptance period, a first Like operation acceptance period and a second Like operation acceptance period are prepared.

In the fifth embodiment, the first Skip operation acceptance period is a period in which the music is skipped by the swing once and the second Skip operation acceptance period is a period in which the music is skipped by the swing twice (within predetermined time).

In addition, in the fifth embodiment, the first Like operation acceptance period is a period in which the Like registration of the music is executed by the nodding once, and the second Like operation acceptance period is a period in which the Like registration of the music is executed by the nodding twice (within predetermined time).

In addition, in the second Skip operation acceptance period and the second Like operation acceptance period, the number of times of the swing and the number of the nodding are not limited to two and may be three or more. Furthermore, in the second Skip operation acceptance period and the second Like operation acceptance period, if different number of times of the gestures is performed, the operations may be accepted (for example, in second Skip operation acceptance period, Skip by swing twice, in second Like operation acceptance period, Like registration by nodding three times, etc.).

Here, the position and the length of the first Skip operation acceptance period correspond to the position and the length of the Skip operation acceptance period in each of the above-described embodiments. The position and the length of the second Skip operation acceptance period correspond to the position and the length of the Skip operation block period in each of the above-described embodiments.

Similarly, the position and the length of the first Like operation acceptance period correspond to the position and the length of the Like operation acceptance period in each of the above-described embodiments. The position and the length of the second Like operation acceptance period correspond to the position and the length of the Like operation block period in each of the above-described embodiments.

That is, in the fifth embodiment, the second Skip operation acceptance period is set instead of the Skip operation block period in each of the above-described embodiments, and the second Like operation acceptance period is set instead of the Like operation block period.

In the example shown in FIG. 15, in the reproduction period of the music, two types of periods of the first operation acceptance period (first Skip operation acceptance period, first Like operation acceptance period) and the second operation acceptance period (second Skip operation acceptance period, second Like operation acceptance period) are included, but three types of periods of the first operation acceptance period, the second operation acceptance period, and the operation block period may be included.

Figure 16:
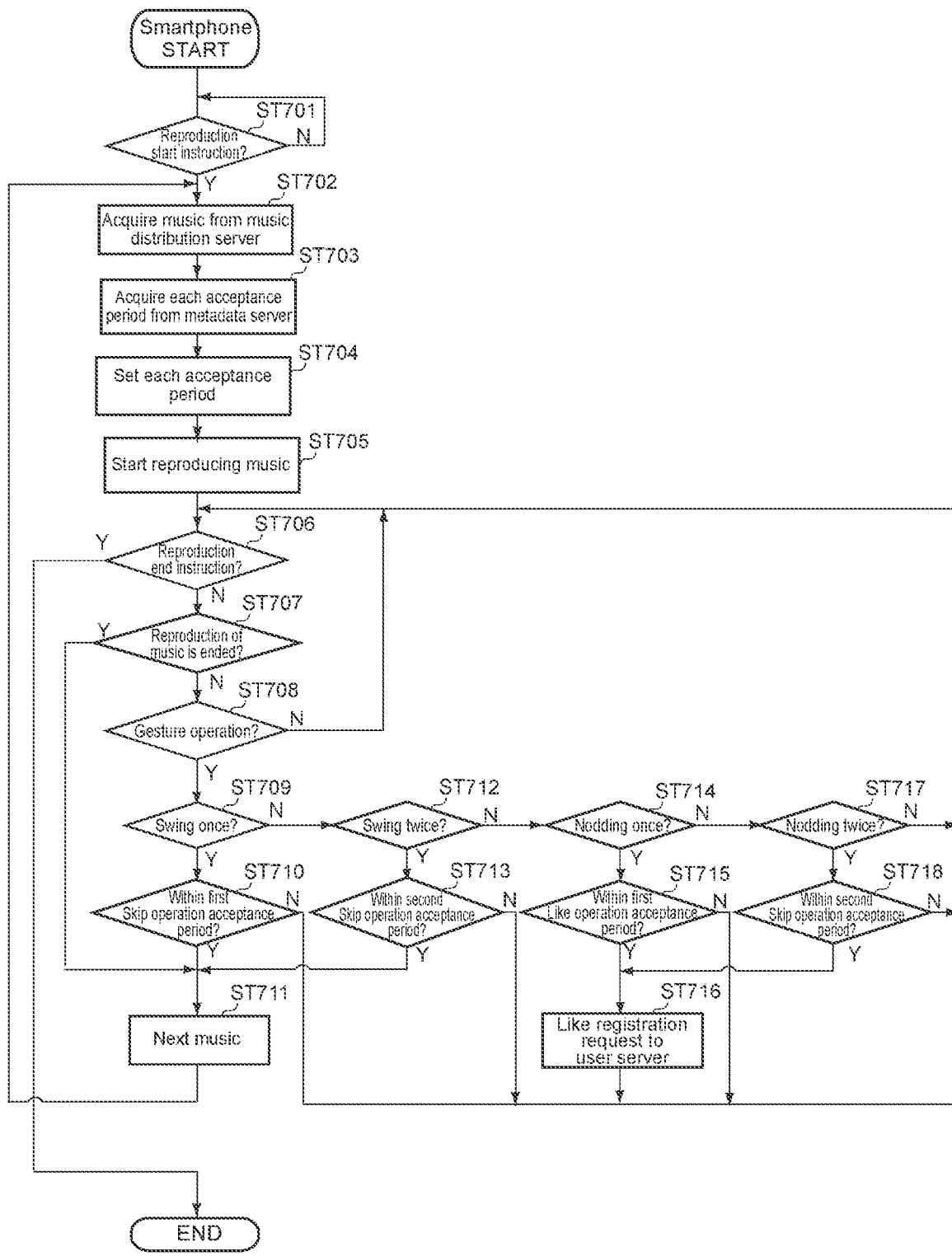
FIG. 16 is a flowchart showing processing executed by the smartphone in the fifth embodiment.

FIG. 16 is a flowchart showing processing executed by the smartphone 20 in the fifth embodiment.

In the processing of FIG. 16, Steps 701 to 708 are typically the same as Steps 101 to 108 in FIG. 6.

In Step 703, the smartphone 20 acquires the first Skip operation acceptance period and the first Like operation acceptance period (corresponding to Skip acceptance period and Like operation acceptance period in each of above-described embodiments) from the metadata server 30c.

Then, in Step 704, the smartphone 20 sets the first Skip operation acceptance period and sets the second Skip operation acceptance period in a period out of the first Skip operation acceptance period. Similarly, the smartphone 20 sets the first Like operation acceptance period and sets the second Skip operation acceptance period in a period out of the first Like operation acceptance period.

If the gesture operation is input by the user (YES in Step 708), the smartphone 20 determines whether or not the gesture operation is the swing once (Step 709). If the gesture operation is the swing once (YES in Step 709), the smartphone 20 determines whether or not it is currently the first Skip operation acceptance period (Step 710).

If it is currently the first Skip operation acceptance period (YES in Step 710), the smartphone 20 skips the music (Step 711). On the other hand, if it is not currently the first Skip operation acceptance period (NO in Step 710), the smartphone 20 returns to Step 706 without skipping the music.

In Step 709, when the gesture operation is not the swing once (NO in Step 709), the smartphone 20 determines whether or not the gesture operation is the swing twice (Step 712).

If the gesture operation is the swing twice (YES in Step 712), the smartphone 20 determines whether or not the gesture operation is currently within the second Skip operation acceptance period (Step 713). If it is currently the second Skip operation acceptance period (YES in Step 713), the smartphone 20 skips the music (Step 711). On the other hand, if it is not currently the second Skip operation acceptance period (NO in Step 713), the smartphone 20 returns to Step 706.

In Step 712, if the gesture operation is not the swing twice (Step 712, NO), the smartphone 20 determines whether or not the gesture operation is the nodding once (Step 714). If the gesture operation is the nodding once (YES in Step 714), the smartphone 20 determines whether or not it is currently the first Like operation acceptance period (Step 715).

If it is currently the first Like operation acceptance period (YES in Step 715), the smartphone 20 transmits the Like registration request to the user data server 30*d* (Step 716). On the other hand, if it is not currently the first Like operation acceptance period (NO in Step 715), the smartphone 20 returns to Step 706 without transmitting the Like registration request.

In Step 714, if the gesture operation is not the nodding once (NO in Step 714), the smartphone 20 determines whether or not the gesture operation is the nodding twice (Step 717).

If the gesture operation is the nodding twice (YES in Step 717), the smartphone 20 determines whether or not it is currently within the second Like operation acceptance time (Step 718). If it is currently the second Like operation acceptance period (YES in Step 718), the smartphone 20 transmits the Like registration request to the user data server 30*d* (Step 716). On the other hand, if it is not currently the second Like operation acceptance period (NO in Step 718), the smartphone 20 returns to Step 706.

In the fifth embodiment, the second operation acceptance period has a condition for executing processing such as Skip and Like more stringent than in the first operation acceptance period. Therefore, it is possible to appropriately prevent a malfunction from occurring contrary to the intention of the user. Furthermore, in the fifth embodiment, since the gesture operation is not completely blocked, the user can perform arbitrary input by the swing twice, the nodding twice, or the like even not within the first operation acceptance period.

In the first operation acceptance period, sensitivity of acceptance of the gesture operation by the user may be relatively high, and in the second operation acceptance period, the sensitivity of acceptance of the gesture operation by the user may be relatively low. For example, in the first operation acceptance period, processing may be performed such that a threshold value of a detection angle of the gesture operation is lowered and the threshold value of the detection angle is raised when the operation is shifted to the second operation acceptance period in order to more easily sense the gesture operation. Gesture detection may be performed using a method such as machine learning or deep learning, and in this case, a threshold value of the gesture detection may be changed by the machine learning or the like.

In this case, for example, in the first Skip operation acceptance period, the music is skipped even in small swing (once), but in the second Skip operation acceptance period, the music is not skipped unless it is large swing (once).

Furthermore, for example, in the first Like operation acceptance period, the Like registration of the music is executed even in small nodding (once), but in the second Like operation acceptance period, the Like registration of the music is not executed unless it is the large nodding (once).

Furthermore, for example, there are the following methods. In the first Skip operation acceptance period, the music is skipped at the swing (once). In the second Skip operation acceptance period, a sound "Do you skip?" is output with respect to the swing (once), and if the swing is performed with respect to the sound, the music is skipped.

Furthermore, for example, in the first Like operation acceptance period, the Like registration of the music is executed at the nodding (once). In the second Like operation acceptance period, a sound of "Do you Like registration?" is output with respect to the nodding (once), and if the nodding (once) is performed for the sound, the Like registration of the music is executed.

Typically, any method may be used as long as a condition for accepting the user operation in the second operation acceptance period is set to be more stringent than in the first operation acceptance period.

Sixth Embodiment

Next, a sixth embodiment of the present technology will be described. In the sixth embodiment, a presentation order of items of a menu by an SUI (Sound User Interface) is variably controlled in accordance with the reproduction position of the music. The SUI here is a user interface characterized in that it is bearable, in which the sound presented by the system and the input by the user operation are used.

Figure 17:
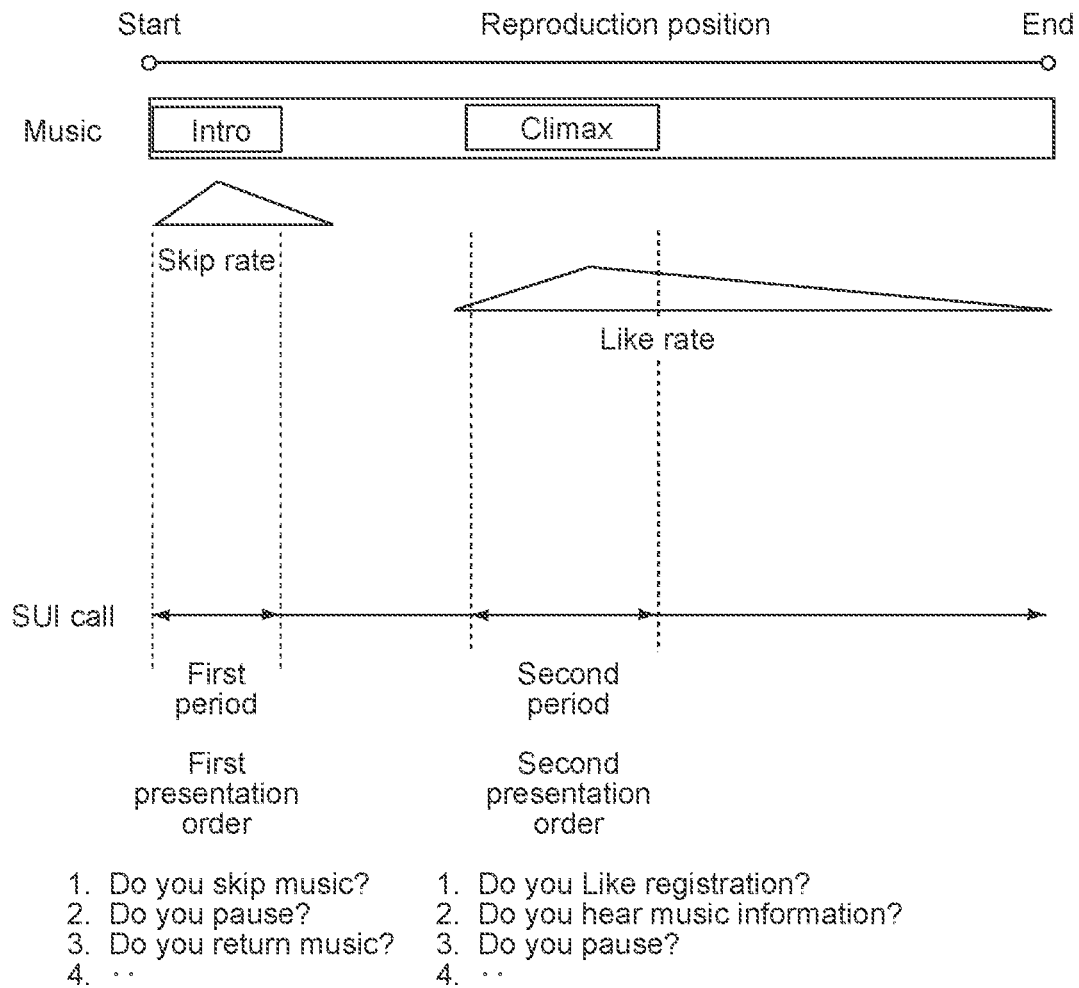
FIG. 17 is a diagram showing a presentation order of items of a menu.

FIG. 17 is a diagram showing the presentation order of the items of menu. As shown in FIG. 17, a first period is set in a period corresponding to an intro of music having a high Skip rate. In addition, a second period is set in a period corresponding to a climax having a high Like rate.

The first period corresponds to the Skip operation acceptance period (first Skip operation acceptance period) of each of the above-described embodiments, and the second period corresponds to the Like operation acceptance period (first Like operation acceptance period) of each of the above-described embodiments. The positions, the lengths and the like of the first period and the second period are the same as the positions, the lengths and the like of the Skip operation acceptance period and the Like operation acceptance period of each of the above-described embodiments.

Therefore, for example, the first period and the second period can be determined by performing the intro analysis, the climax analysis, and the like by the analysis server 30*b*.

When a SUI call operation (which may be any operation such as gesture, tap, voice, or the like) is performed within the first time interval, the sound corresponding to the items is presented to the user in a first presentation order. In the first presentation order, the order of the items is determined so that the item that is highly likely to be input by the user comes first.

In the first presentation order, the items are presented in the following order: 1. "Do you skip music?", 2. "Do you pause?", 3. "Do you return the music?". That is, in the first period, since the possibility of skipping the music is highest, the item corresponding to the skip of the music is presented first.

In the second presentation order, the items are presented in the following order: 1. "Do you Like registration?", 2. "Do you hear music information?", 3. "Do you pause?" . . . . That is, in the second period, since the possibility of Like registration of the music is highest, the item corresponding to the Like registration of the music is presented first.

The first presentation order and the second presentation order are determined by, for example, analysis by the analysis server 30*b*. For example, the analysis server 30*b* determines the first presentation order and the second presentation order based on the time distribution of the Skip rate, the time distribution of the Like rate, the time distribution of a temporary stop rate, the time distribution of the returned music (returning to previous music), the time distribution of the rate of hearing music information, etc.

These time distributions may vary from music to music and may vary from user to user. Therefore, the first presentation order and the second presentation order may be variable for each music piece or for each user.

In addition, in the presentation of the items by the sound, when a sound presentation of each item is performed in a full sentence: 1. "Do you skip music?", 2. "Do you pause music?", and 3. "Do you return music?", it may be troublesome for the user who is familiar with the operation. Therefore, the sound presentation may be performed in the full sentence until the Nth operation, and a simple sound presentation such as 1. "Skip?", 2. "Pause?", and 3. "Return music?" may be performed after the N+1st time.

In the description herein, the sound item presentation is described, but the item presentation may be performed by display by GUI (Graphical User Interface) or the like.

Seventh Embodiment

Figure 18:
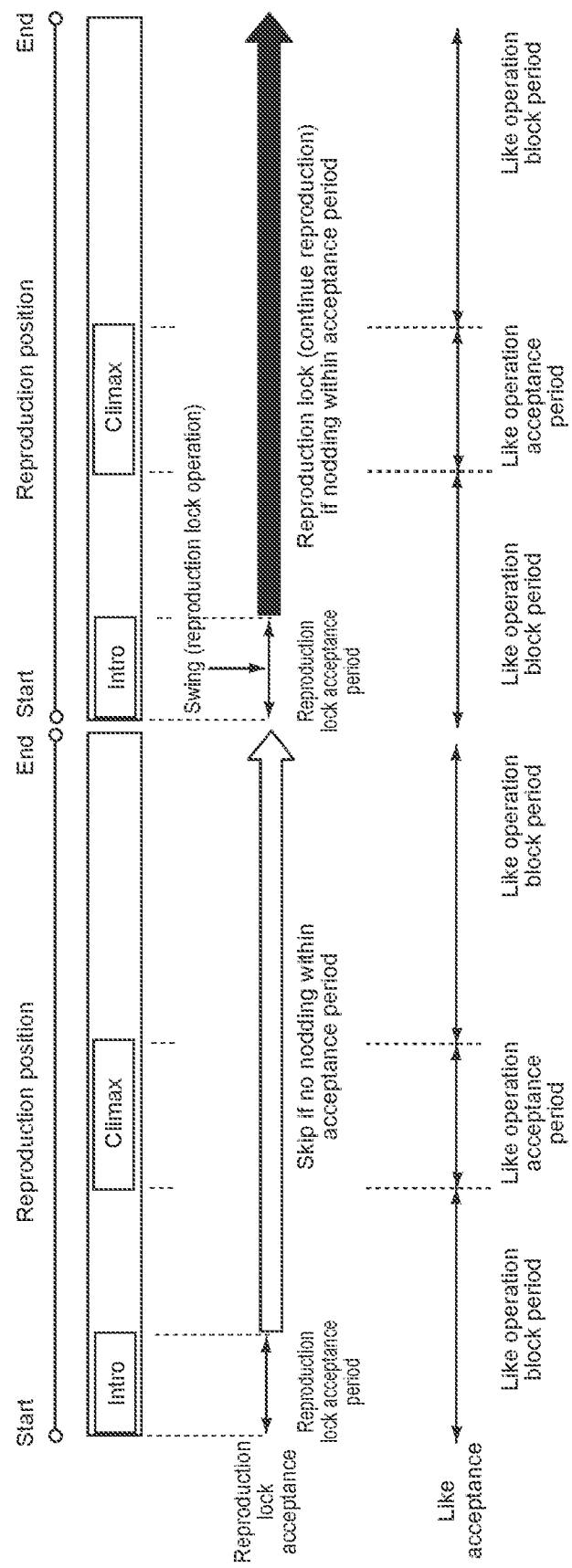
FIG. 18 is a diagram showing an operation acceptance period in a seventh embodiment.

Next, a seventh embodiment of the present technology will be described. FIG. 18 is a diagram showing each operation acceptance period in the seventh embodiment.

In the seventh embodiment, a reproduction lock operation acceptance period is set instead of the Skip operation acceptance period in each of the above-described embodiments. A reproduction lock is processing for setting the reproduction of the music to the reproduction lock state (continuous reproduction), and the reproduction lock operation is the user operation for the reproduction lock.

In the seventh embodiment, the reproduction lock operation is the gesture operation by the user nodding but may be any operation.

In the example shown in FIG. 18, the reproduction lock period is a period corresponding to the intro of the music. The position and the length of the reproduction lock operation acceptance period correspond to the position and the length of the Skip operation acceptance period in each of the above-described embodiments (may be variable or fixed).

If the user does not perform the reproduction lock operation (nodding) within the reproduction lock operation period, it skips to the next music. On the other hand, if the user performs the reproduction lock operation (nodding) within the reproduction lock operation acceptance period, the music is not skipped and the reproduction is continued (reproduction is locked).

In the seventh embodiment, as long as the user does not actively nod, the music is skipped with good tempo, i.e., the next music, the next music, . . . . Here, in particular, in the case of the user using distribution of music in the subscription, since the number of available music pieces is large, it is convenient for the user to execute such processing of skipping music one after another in this manner.

Eighth Embodiment

In the above description, music is described as an example of reproducible content. On the other hand, in the description of an eighth embodiment, a moving image will be described as an example of the content.

A music video includes the music and the moving image. With respect to the music video, the same processing as the processing in the music in each of the above-described embodiments may be executed, or the processing in the moving image described below may be executed.

In the eighth embodiment, a moving image distribution server is prepared instead of the music distribution server 30*a*. The moving image distribution server distributes various moving images in response to a request from each smartphone 20. The moving image may be a moving image of moving image distribution or may be a television program recorded by the user. The moving image is displayed on the display unit 23 of the smartphone 20.

Figure 19:
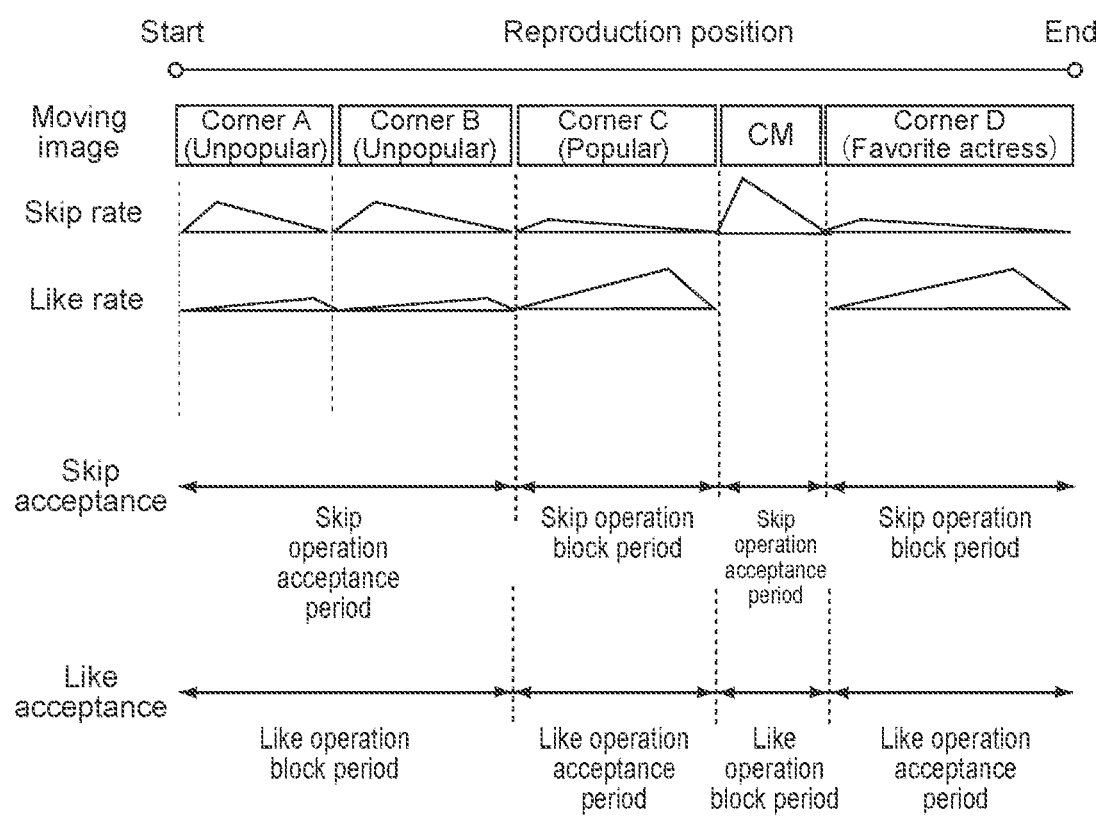
FIG. 19 is a diagram showing the Skip operation acceptance period and the Like operation acceptance period in an eighth embodiment.

FIG. 19 is a diagram showing each Skip operation acceptance period and each Like operation acceptance period in the eighth embodiment.

The moving image is divided into respective scenes, including a corner A, a corner B, a corner C, CM, and a corner D (which can be classified by metadata).

The analysis server 30*b* acquires and aggregates Skip and Like timings (time stamps) from each smartphone 20, thereby aggregating the time distribution of the Skip rate and the time distribution of the Like rate for each program (see triangles). Since the time distribution of the Skip rate and the time distribution of the Like rate may change for each user, the analysis server 30*b* may aggregate the time distribution of the Skip rate and the Like rate for each user.

The analysis server 30*b* generates each Skip operation acceptance period based on the time distribution of the Skip rate. For example, since the Skip rate of the corner A, the corner B, and the CM is relatively higher than that of the other corner, the periods corresponding to the corner A, the corner B, and the CM are set as the Skip operation acceptance periods.

In addition, the analysis server 30*b* generates each Like operation acceptance period based on the time distribution of the Like rate. For example, since the corner C and the corner D have relatively higher Like rates than the other corners, the periods corresponding to the corner C and the corner D are set as the Like operation acceptance periods.

It should be noted that the analysis server 30*b* may generate the operation acceptance periods based on the metadata of the moving image instead of the time distribution or in addition to the time distribution. For example, the analysis server 30*b* can recognize who is appearing at each corner from the metadata of the moving image. In this case, for example, in a case in which a favorite actress of the user is appearing in the corner D (obtained from user data server 30*d*), the analysis server 30*b* sets a period corresponding to the corner D as the Like operation acceptance period. In addition, the analysis server 30*b* excludes a period corresponding to the corner D from the Skip operation acceptance period.

In this example, the period out of the Skip operation acceptance period is the Skip operation block period, but instead of the Skip operation block period, the second Skip operation acceptance period (condition for input is stringent) may be set. Similarly, instead of the Like operation block period, the second Like operation acceptance period (condition for input is stringent) may be set.

Figure 20:
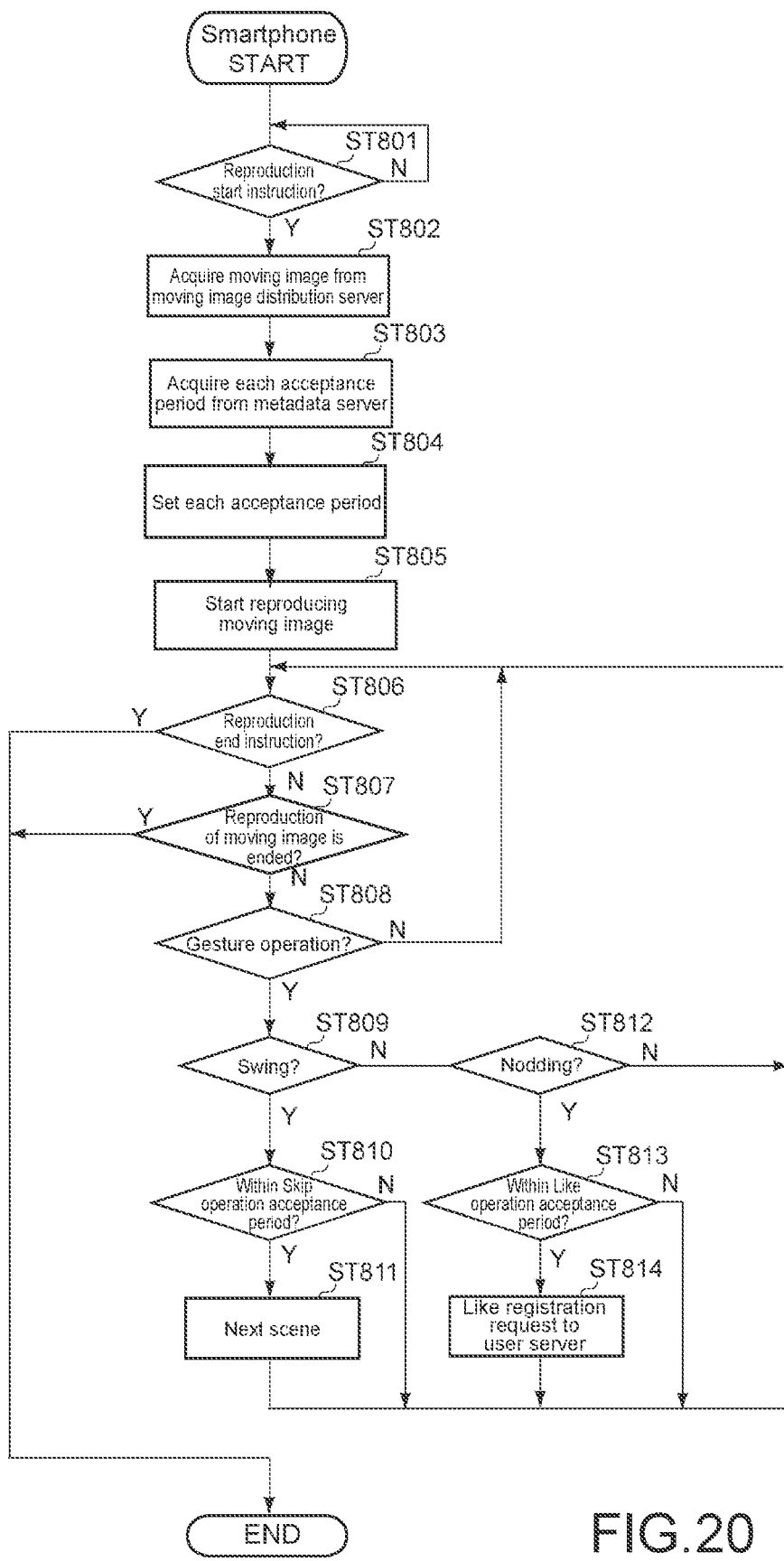
FIG. 20 is a flowchart showing processing executed by the smartphone in the eighth embodiment.

FIG. 20 is a flowchart showing processing executed by the smartphone 20 in the eighth embodiment.

First, if the reproduction start instruction of the moving image is input from the user (YES in Step 801), the smartphone 20 acquires the moving image from the moving image distribution server (via streaming) (Step 802).

Next, the smartphone 20 acquires the Skip operation acceptance periods and the Like operation acceptance periods from the metadata server 30*c* (Step 803). The Skip operation acceptance periods and the Like operation acceptance periods are generated in advance by the analysis server 30*b* and stored in the metadata server 30*c*.

Next, the smartphone 20 sets the Skip operation acceptance periods and the Like operation acceptance periods (Step 804), and starts reproducing the moving image (Step 805). Next, the smartphone 20 determines whether or not the reproduction end instruction is input from the user (Step 806), and if the reproduction end instruction is input (YES in Step 806), the reproduction of the moving image is ended and the processing is ended.

On the other hand, if the reproduction end instruction is not input (NO in Step 806), the smartphone 20 determines whether or not the reproduction of a currently reproduced moving image is ended (Step 807). If the reproduction of the moving image is ended (YES in Step 807), the smartphone 20 ends the processing.

On the other hand, if the reproduction of the moving image is not ended (NO in Step 807), the smartphone 20 determines whether or not the gesture operation is input from the user (Step 808). If the gesture operation is input (YES in Step 808), the smartphone 20 determines whether or not the gesture operation is the swing (Step 809).

If the gesture operation is the swing (YES in Step 809), the smartphone 20 determines whether or not it is currently within the Skip operation acceptance period (Step 810). If it is currently within the Skip operation acceptance period (YES in Step 810), the smartphone 20 executes processing of skipping the current scene to the next scene (Step 811) and returns to Step 806.

On the other hand, if it is not currently the Skip operation acceptance period (NO in Step 810) (that is, if it is Skip operation block period), the smartphone 20 returns to Step 806 without executing the processing of skipping the scene.

In Step 809, if the gesture operation is not the swing (NO in Step 809), the smartphone 20 determines whether or not the gesture operation is the nodding (Step 812). If the gesture operation is the nodding (YES in Step 812), the smartphone 20 determines whether or not it is currently the Like operation acceptance period (Step 813).

If it is currently within the Like operation acceptance period (YES in Step 813), the smartphone 20 transmits the Like registration request for the scene to the user data server 30d (Step 814), and returns to Step 806.

On the other hand, if it is not currently the Like operation acceptance period (NO in Step 813) (that is, if it is Like operation block period), the smartphone 20 returns to Step 806 without transmitting the Like registration request for the scene.

Other Examples

Next, other examples in which the content is the moving image will be described.

View Favorite Scenes Repeatedly

Some users watch favorite scenes repeatedly. For this reason, for example, a method of setting a repeat operation acceptance period in the second half of the scene or the like for a Like registered scene may be contemplated. When the user performs a repeat operation (for example, nodding) within the repeat operation acceptance period, the same scene is repeated.

Change Processing According to Stop Position of Moving Image

For example, if the user performs a stop operation when a stop position of the moving image is a climax scene of the moving image, it is considered that the user is highly likely to view the moving image from the stop position. On the other hand, if the stop position of the moving image is immediately after the start of the moving image, it is considered that the user is less likely to view the moving image from the position where the user is stopped.

Therefore, for example, if the stop position of the moving image is the climax scene (recognizable from metadata), the smartphone 20 designates the moving image as the moving image to be viewed next. On the other hand, if the stop position of the moving image is immediately after the start of the moving image, the smartphone 20 does not designate the moving image as a moving image to be viewed next.

It is also assumed that it is difficult to determine what kind of feeling the user views the moving image and what kind of intention the moving image is stopped (because it is interesting, also view next; or it is not interesting, and not view next) by only the stop position of the moving image.

Therefore, based on the following information, the intention of the user (because it is interesting, also view next; or it is not interesting, and not view next) may be determined.

1. Content-Dependent Information (1) Reproduction completion rate (statistics) . . . The higher the reproduction completion rate based on the statistics, the higher the possibility that the user also considers the moving image to be interesting is.

(2) Number of times of programs in series . . . The higher number of times of programs is, and the higher the possibility that the user also considers the moving image to be interesting is.

(3) Rating . . . The higher the rating is, the higher the possibility that the user also considers the moving image to be interesting is.

2. User-Dependent Information (4) Emotion sensor . . . The emotion sensor (for example, heartbeat sensor, perspiration sensor, etc. mounted on headphone 10 etc.) determines an emotion of the user when stops. If a change in the emotion of the user is large, there is a high possibility that the user considers the moving image to be interesting.

(5) User schedule . . . The user schedule (stored in smartphone 20 etc.) is compared with a stop time of the moving image. If the stop time of the moving image overlaps with the user schedule, it is possible to figure out that the moving image is stopped due to a reason (it is highly likely that the moving image is interesting).

For example, the smartphone 20 comprehensively determines the stop position of the moving image and at least one piece of information among (1) to (5) and determines what intention the user has stopped the moving image. If the smartphone 20 determines that the user considers the moving image to be interesting, the smartphone 20 designates the moving image as a moving image to be viewed next. On the other hand, if the smartphone 20 determines that the user considers the moving image to be not interesting, the smartphone 20 does not designate the moving image as a moving image to be viewed next.

Various Modified Examples

In the above description, the case in which the user operation is the gesture operation (swing, nodding, etc.) is described. On the other hand, the user operation is not limited to the gesture operation. For example, the user operation may be the operation of tapping the image displayed on the display unit 23 of the smartphone 20. In this case, for example, when the user taps an image during the reproduction of the music or the moving image, skip is performed if the timing at which the tapping operation is performed is within the Skip operation acceptance period. Furthermore, the Like registration is performed if the timing at which the tapping operation is performed is within the Like operation acceptance period.

In the above description, the case in which the target to be controlled by the gesture operation of the headphone 10 is the smartphone 20 is described. On the other hand, the control target is not limited to the smartphone 20, and may be any device such as a PC, a television device, or an audio device (if the content is the moving image, the control target may include the display unit 23).

The processing in the smartphone 20 described above may be executed by the headphone 10 or may be executed by the server device 30. The above-described processing in the analysis server 30b may be executed by the smartphone 20 or the headphone 10.

In the present specification, the "information processing apparatus" means a main constituent that executes the above-described various processing. Therefore, the headphone 10 alone, the smartphone 20 alone, and the server device 30 alone can be regarded as the information processing apparatus. A combination (system) of two or more of the headphone 10, the smartphone 20, and the server device 30 can be regarded as the information processing apparatus.

The present technology may also have the following structures.

(1) An information processing apparatus, including:
 a control unit that accepts a user operation during reproduction of content having a predetermined time length and variably controls processing to be executed for the user operation in accordance with a reproduction position of the content when the user operation is performed.
(2) The information processing apparatus according to (1), in which
 the control unit sets for each processing a first operation acceptance period for accepting the user operation corresponding to each processing at the reproduction position.
(3) The information processing apparatus according to (2), in which
 each processing includes at least first processing and second processing, and
 a first operation acceptance period corresponding to the first processing and a second operation acceptance period corresponding to the second processing are set to different reproduction positions.
(4) The information processing apparatus according to (2) or (3), in which
 the control unit sets an operation block period in which the user operation is not accepted in a period out of the first operation acceptance period.
(5) The information processing apparatus according to (2) or (3), in which
 the control unit sets a second operation acceptance period in a period out of the first operation acceptance period.
(6) The information processing apparatus according to (5), in which
 a condition for accepting the user operation in the second operation acceptance period is different in the first operation acceptance period.
(7) The information processing apparatus according to (6), in which
 the condition for accepting the user operation in the second operation acceptance period is set to be more stringent than in the first operation acceptance period.
(8) The information processing apparatus according to any one of (2) to (6), in which
 the control unit variably controls at least one of a length or a position of the first operation acceptance period.
(9) The information processing apparatus according to (8), in which
 the control unit variably controls the first operation acceptance period for each content or for each user.
(10) The information processing apparatus according to (8) or (9), in which
 the control unit variably controls the first operation acceptance period based on metadata of the content.
(11) The information processing apparatus according to any one of (8) to (10), in which
 the control unit variably controls the first operation acceptance period based on timing at the reproduction position where the user operation is performed.
(12) The information processing apparatus according to (11), in which
 the control unit statistically acquires a time distribution at timing at the reproduction position where the user operation is performed and variably controls the first operation acceptance period based on the time distribution.
(13) The information processing apparatus according to (12), in which
 the control unit acquires the time distribution by statistically acquiring timing of the user operation by a plurality of users or a user individual.
(14) The information processing apparatus according to (1), in which
 the control unit changes a priority of items presented to the user in accordance with the reproduction position of the content.
(15) The information processing apparatus according to (14), in which
 the control unit statistically acquires the time distribution at timing at the reproduction position where the user operation is performed and variably controls the priority of the items based on the time distribution.
(16) The information processing apparatus according to (15), in which
 the control unit acquires the time distribution by statistically acquiring timing of the user operation by a plurality of users or a user individual.
(17) The information processing apparatus according to any one of (1) to (16), in which the user operation includes a gesture operation.
(18) An information processing system, including:
 a first device that detects a user operation; and
 a second device that accepts the user operation during reproduction of content having a predetermined time length and variably controls processing to be executed for the user operation in accordance with a reproduction position of the content when the user operation is performed.
(19) An information processing method, including:
 accepting a user operation during reproduction of content having a predetermined time length, and
 variably controlling processing to be executed for the user operation according to a reproduction position of the content when the user operation is performed.

(20) A program that causes a computer to execute processing of accepting a user operation during reproduction of content having a predetermined time length and variably and controlling processing to be executed for the user operation according to a reproduction position of the content when the user operation is performed.

REFERENCE SIGNS LIST 10 headphone
20 smartphone
30 server device
100 information processing apparatus

The invention claimed is:

1. An information processing apparatus, comprising:
   circuitry configured to:
      set a first operation acceptance period in a part of a reproduction period of content, wherein
         the first operation acceptance period is based on metadata of the content, and
         the first operation acceptance period is set for acceptance of a user operation corresponding to a first process;
      receive the user operation during reproduction of the content; and
      variably control execution of the first process for the user operation, wherein the variable control is based on:
         the set first operation acceptance period, and
         a reproduction position of the content at a time at which the user operation is performed.

2. The information processing apparatus according to claim 1, wherein
   the circuitry is further configured to set a second operation acceptance period corresponding to a second process, and
   the first operation acceptance period and the second operation acceptance period are set to different reproduction positions of the content.

3. The information processing apparatus according to claim 1, wherein the circuitry is further configured to set an operation block period in which the user operation is not accepted in a period out of the first operation acceptance period.

4. The information processing apparatus according to claim 1, wherein the circuitry is further configured to set a second operation acceptance period in a period out of the first operation acceptance period.

5. The information processing apparatus according to claim 4, wherein a condition for the acceptance of the user operation in the second operation acceptance period is different from a condition of the acceptance of the user operation in the first operation acceptance period.

6. The information processing apparatus according to claim 5, wherein
   the circuitry is further configured to set a threshold for the acceptance of the user operation in each of the first operation acceptance period and the second operation acceptance period, and
   the threshold for the acceptance of the user operation in the second operation acceptance period is set higher than the threshold for the acceptance of the user operation in the first operation acceptance period.

7. The information processing apparatus according to claim 1, wherein the circuitry is further configured to variably control at least one of a length or a position of the first operation acceptance period.

8. The information processing apparatus according to claim 7, wherein the circuitry is further configured to variably control the first operation acceptance period one of for the content or for each user.

9. The information processing apparatus according to claim 7, wherein the circuitry is further configured to variably control the first operation acceptance period based on a timing at the reproduction position where the user operation is performed.

10. The information processing apparatus according to claim 9, wherein the circuitry is further configured to:
    statistically acquire a time distribution based on the timing at the reproduction position where the user operation is performed; and
    variably control the first operation acceptance period based on the time distribution.

11. The information processing apparatus according to claim 10, wherein the circuitry is further configured to:
    acquire the timing of the user operation by one of a plurality of users or an individual user; and
    acquire the time distribution based on the acquired timing.

12. The information processing apparatus according to claim 1, wherein
    the circuitry is further configured to change a priority of items presented to a user, and
    the change is based on the reproduction position of the content.

13. The information processing apparatus according to claim 12, wherein the circuitry is further configured to:
    statistically acquire a time distribution based on a timing at the reproduction position where the user operation is performed; and
    variably control the priority of items based on the time distribution.

14. The information processing apparatus according to claim 13, wherein the circuitry is further configured to:
    acquire the timing of the user operation by one of a plurality of users or an individual user; and
    acquire the time distribution based on the acquired timing.

15. The information processing apparatus according to claim 1, wherein the user operation includes a gesture operation to one of skip playback of the content or bookmark the content.

16. An information processing system, comprising:
    a first device configured to detect a user operation; and
    a second device configured to:
       set a first operation acceptance period in a part of a reproduction period of content, wherein
          the first operation acceptance period is based on metadata of the content, and
          the first operation acceptance period is set for acceptance of the user operation corresponding to a first process;
       receive the user operation during reproduction of the content; and
       variably control execution of the first process for the user operation, wherein the variable control is based on:
          the set first operation acceptance period, and
          a reproduction position of the content at a time at which the user operation is performed.

17. An information processing method, comprising:
    setting a first operation acceptance period in a part of a reproduction period of content, wherein
       the first operation acceptance period is based on metadata of the content, and
       the first operation acceptance period is set for acceptance of a user operation corresponding to a first process;

receiving the user operation during reproduction of the content; and variably controlling execution of the first process for the user operation, wherein the variable control is based on:
- the set first operation acceptance period, and
- a reproduction position of the content at a time at which the user operation is performed.

18. A non-transitory computer-readable medium having stored thereon, computer-executable instructions which, when executed by a processor, cause the processor to execute operations, the operations comprising:

setting a first operation acceptance period in a part of a reproduction period of content, wherein
- the first operation acceptance period is based on metadata of the content, and
- the first operation acceptance period is set for acceptance of a user operation corresponding to a first process;

receiving the user operation during reproduction of content; and variably controlling execution of the first process for the user operation, wherein the variable control is based on:
- the set first operation acceptance period, and
- a reproduction position of the content at a time at which the user operation is performed.

* * * * *